United States Patent
Ozaki et al.

[11] Patent Number: 5,870,188
[45] Date of Patent: Feb. 9, 1999

[54] MEASURING METHOD AND MEASURING APPARATUS BY LIGHT SCATTERING

[75] Inventors: Yukihiro Ozaki, Nishinomiya; Yoshinori Yamaguchi, Minami-ku; Xiaoming Dou, Minami-ku; Harumi Uenoyama, Minami-ku, all of Japan

[73] Assignee: Kyoto Dei-ichi, Kagaku Co. Ltd., Kyoto, Japan

[21] Appl. No.: 715,974

[22] Filed: Sep. 19, 1996

[30] Foreign Application Priority Data

Sep. 20, 1995 [JP] Japan ................................... 7-267886

[51] Int. Cl.$^6$ .................................................. G01J 3/44
[52] U.S. Cl. ................................................... 356/301
[58] Field of Search ............................................. 356/301

[56] References Cited

U.S. PATENT DOCUMENTS

| | | | |
|---|---|---|---|
| 3,185,021 | 5/1965 | Thompson | 356/332 |
| 4,077,719 | 3/1978 | Barrett et al. | 356/301 |
| 4,405,237 | 9/1983 | Thomas et al. | |
| 4,512,660 | 4/1985 | Goldberg | 356/301 |
| 4,573,792 | 3/1986 | Kajiyama et al. | 356/301 |
| 4,784,486 | 11/1988 | Van Wagenen et al. | 356/301 |
| 4,823,166 | 4/1989 | Hartog et al. | 356/301 |
| 4,832,483 | 5/1989 | Verma | 356/301 |
| 5,182,214 | 1/1993 | Kessler et al. | |
| 5,247,343 | 9/1993 | Burch | |
| 5,303,710 | 4/1994 | Bashkansky et al. | 356/301 |
| 5,386,295 | 1/1995 | Switalski et al. | |
| 5,506,678 | 4/1996 | Carlsen et al. | 356/301 |
| 5,510,894 | 4/1996 | Batchelder et al. | 356/301 |

FOREIGN PATENT DOCUMENTS

| | | |
|---|---|---|
| 1681204 | 9/1991 | U.S.S.R. |
| WO 94/24545 | 10/1994 | WIPO |

OTHER PUBLICATIONS

Chikishev et al, Biophysical Journal, vol. 63, No. 4, "Polarization sensitive coherent anti–Stokes Raman scattering spectroscopy of the amide I band of proteins in solutions", Oct. 1992, USA.

Patent Abstracts of Japan, vol. 012, No. 156, May 13, 1988.

*Primary Examiner*—Frank G. Font
*Assistant Examiner*—Zandra V. Smith
*Attorney, Agent, or Firm*—Nikaido Marmelstein Murray & Oram, LLP

[57] ABSTRACT

An excitation beam from a laser is passed through a band-pass filter, and applied to a sample by a collimator lens. An optical adjusting part comprising a camera lens and a converging lens is provided for receiving scattered light from the sample, so that the camera lens receives the scattered light and converts the same to a parallel beam. The converging lens has chromatic aberration, and receives and converges the parallel beam from the camera lens. An inlet slit of a spectroscope is provided as an inlet port on a converging position by the converging lens. This inlet slit is a circular hole having a diameter of about 200 $\mu$m. The inlet slit is arranged on a position for converging anti-Stokes-Raman scattered light through the chromatic aberration of the converging lens.

19 Claims, 29 Drawing Sheets

MEASURING METHOD AND MEASURING APPARATUS BY LIGHT SCATTERING

BACKGROUND OF THE INVENTION

1. Field of the Invention

The present invention relates to a method of and an apparatus for measuring a target substance contained in a mixture sample, particularly a vital substance such as urine or blood plasma, by a light scattering method for qualitatively and quantitatively measuring its component such as glucose, acetone or urea, and more particularly, it relates to a measuring method and a measuring apparatus employing anti-Stokes-Raman scattering as light scattering.

2. Description of the Background Art

There are many methods of quantitatively measuring concentrations of substances by light scattering. In relation to methods employing Raman scattering, there is a method of nondestructively measuring a concentration through the fact that Raman scattering intensity is proportionate to the glucose concentration in a sample (refer to Japanese Patent Laying-Open Gazette No. 7-49309 (1995)). This method utilizes near infrared light as excitation light for suppressing fluorescence from the sample, condenses scattered light from the sample by a lens, blocks off Rayleigh scattered light through a notch filter, and thereafter separates the scattered light into its spectral components through a spectroscope for obtaining the Raman scattering spectrum of a target substance contained in the sample, thereby determining the target substance.

In general, a laser of near infrared or a longer wavelength is employed in order to determine a target substance while avoiding fluorescence generated from a mixture of a substance derived from an organism or another fluorescing substance ("Laser Raman Bunko to Rinsho Igaku" by Yukihiro Ozaki et al., O Plus E 1992 4 92–99). However, the intensity of Raman scattering is weakened in inverse proportion to the fourth power of the excitation wavelength, and hence the intensity of detected light is remarkably weakened if near infrared light is employed as the excitation light, as compared with excitation by a visible light.

If the excitation light has a longer wavelength than visible, a detector and a spectroscope must be rendered suitable for a longer wavelength. Near infrared surface and array devices are extremely high-priced at present. While methods of measuring Raman scattering through near infrared wavelength light include FT-Raman spectrometry employing Fourier transformation, an FT-Raman spectroscope is large-sized and disadvantageously takes a long time for measurement.

When a sample is measured through the aforementioned Raman scattering or light scattering, the target scattered light spectrum from the sample is often vanished by fluorescence from the sample. The fluorescence is particularly intense when the sample is an organism itself, a substance such as blood, urine, excrements, saliva or tear separated and collected from an organism, or food, fruit or farm products.

In Raman scattering spectra, spectra in regions having large and small photon energy values with respect to excitation light respectively (these spectra are hereinafter referred to as anti-Stokes and Stokes lines respectively) are observed. The Stokes line appears since small parts of molecules holding photons return not to original vibration levels but to vibration levels having different electron ground states (levels higher than the ground states) after liberating the held photons when specific molecules are irradiated with light. On the other hand, the anti-Stokes line appears since electrons originally present at levels having higher energy than ground states do not return to the original levels but make transition to ground state levels along with parts of applied photons after liberating most parts of the applied photons. Namely, the energy widths of the anti-Stokes and Stokes lines become energy differences between the ground states and vibrational excitation states, and hence the anti-Stokes and Stokes lines generally appear on symmetrical positions in terms of shift wavenumbers with respect to the excitation light.

In the fluorescence, on the other hand, a spectrum is present in a region having small quantum energy with respect to the excitation light, i.e., a region having a long wavelength, unless excitation and fluorescence spectra remarkably intersect with each other. Quantumly considering this, the fluorescence is generated since electrons which are present in ground states or at other levels are excited by applied energy through the energy of applied light and stay at a number of levels for an instance during transition from the excitation energy levels to the ground states. Namely, the fluorescence is generated in a region smaller (longer wavelength side) than the quantum energy of the excitation light in general.

Therefore, it is conceivable that a component spectrum of a target substance can be obtained from a sample by a method of Raman spectral analysis while avoiding influence by fluorescence when the anti-Stokes line in Raman scattering analysis is observed, and identification and determination of the target substance can be performed by observing change and intensity of the spectrum of the target substance.

Study of anti-Stokes-Raman scattering includes coherent anti-Stokes-Raman spectroscopy (CARS) for introducing pump light and probe light into a target substance and measuring anti-Stokes-Raman scattering. In the principle of this spectroscopy, wavelengths of two different vibration numbers are introduced into a sample and spectra are forcibly oscillated by a transition vibration number of Raman scattering when the quantum energy difference of the incident light coincides with the transition vibration number of Raman scattering for utilizing the fact that forced vibration in the interior of the substance generates phased nonlinear vibration. In an anti-Stokes-Raman spectrum by CARS, therefore, nonlinear interaction of the light and the substance becomes remarkable dissimilarly to the relation between a concentration and Raman scattering intensity of the target substance in an ordinary linear Raman scattering spectrum.

Further, nonlinear phenomenons such as multiple photon absorption transition, scattering by a higher-order coherent Raman process, induced Raman scattering, a sum frequency and higher harmonic generation coexist, and the spectrum does not necessarily linearly reflects the concentration of the target sample. Therefore, CARS is not utilized as a quantitative analysis method.

Further, many laser light source units are necessary for a spectroscopic system, and hence the apparatus becomes large-scale.

The intensity ratio of anti-Stokes-Raman and Stokes-Raman scattering spectra is approximated by the following equation of Boltzmann distribution:

anti-Stokes intensity/Stokes intensity=exp $(-h\nu/kT)$ where h represents the Planck's constant, k represents the Boltzmann's constant, T represents the absolute temperature, and $\nu$ represents the Raman shift wavenumber.

FIG. 1 shows calculated values of intensity ratios of anti-Stokes-Raman and Stokes Raman lines on the assumption that the absolute value is 300 K on the basis of the Boltzmann distribution. When the sample temperature is 300 K, the intensity ratio is 0.008 at −1000 cm$^{-1}$ (minus sign of the wavenumber expresses an anti-Stokes-Raman scattering by shifting toward a shorter wavelength side than the excitation wavelength), and 0.007 at −1500 cm$^{-1}$. Therefore, it has generally been considered impossible to detect anti-Stokes-Raman scattered light by ordinary linear Raman spectroscopy.

SUMMARY OF THE INVENTION

A first object of the present invention is to make it possible to detect anti-Stokes-Raman scattered light by utilizing a conventional Raman spectroscopic system as such while employing neither high-priced FT-Raman spectroscope nor longer wavelength CCD serving as a photodetector, by setting a detected wavelength at a shorter wavelength side than an excitation wavelength.

A second object of the present invention is to enable correct qualitative/quantitative analysis by making it possible to avoid fluorescence generated when a sample is excited in case of utilizing this method as a sample analysis method.

The present invention is directed to a method of irradiating a sample with excitation light for measuring a target substance in the sample through anti-Stokes-Raman scattered light in scattered light generated from the sample.

When the inventive method is applied to a quantitative analysis method, a shift wavenumber having excellent correlation between the concentration of the target substance in the sample and anti-Stokes-Raman scattering intensity is selected as a measuring shift wavenumber which is specific to the target substance, anti-Stokes-Raman scattering intensity at the measuring shift wavenumber is detected, and the target substance in the sample is quantitatively analyzed through a calibration curve.

The measuring shift wavenumber is a shift wavenumber having a correlation coefficient R of at least 0.6, preferably at least 0.8, between the concentration of the target substance and the anti-Stokes-Raman scattering intensity. The correlation coefficient R is a value calculated by the following equation:

$$R = \frac{\sum_{i=1}^{n}\{(xi-X)(yi-Y)\}}{\sqrt{\left[\sum_{i=1}^{n}(xi-X)^2\right]\left[\sum_{i=1}^{n}(yi-Y)^2\right]}}$$

where xi represents the concentration at each point of each target substance, yi represents anti-Stokes-Raman scattering spectral intensity with respect to xi, X represents an average concentration value of each target substance, and Y represents an average value of anti-Stokes-Raman scattering spectral intensity.

An exemplary sample to which the inventive method is applied is a vital substance such as urine or blood plasma, and an exemplary target substance is a component such as glucose, acetone or urea contained in the vital substance.

A measuring apparatus according to the present invention comprises an excitation light source part having an excitation light source for irradiating a sample with excitation light, a sample part where the sample is irradiated with the excitation light, a converging optical adjusting part for converging scattered light generated from the sample irradiated with the excitation light, and a photoreceiving part comprising a photodetector for detecting the scattered light increasing a density of an anti-Stokes-Raman scattering light.

The converging optical adjusting part may comprise a lens having chromatic aberratin, and the photoreceiving part may have an inlet port for the scattered light on an imaging position of the lens by light of shorter wavelength than a wavelength of the excitation light.

The photoreceiving part may also comprise a dispersion mechanism such as a spectroscope for separating the scattered light incident from the inlet port into its spectral components so that the photodetector of the photoreceiving part can detect anti-Stokes-Raman scattering intensity, or the converging optical adjusting part may comprise a bandpass filter for transmitting only a shift wavenumber of anti-Stokes-Raman scattered light to be detected so that the photoreceiving part detects the scattered light incident from the inlet port at the photodetector without separating the scattered light into its spectral components.

The excitation light source part preferably comprises a bandpass filter for transmitting only an excitation light wavelength applied to the sample.

The converging optical adjusting part may comprise a lens having small chromatic aberration for converging the scattered light generated from the sample and guiding the same to the lens having chromatic aberration as a parallel beam on a light incidence side of the lens having chromatic aberration.

The converging optical adjusting part preferably comprises a holographic notch filter including the excitation light wavelength in its notch region or a cut filter for blocking off the excitation light wavelength and a longer wavelength side, for removing an excitation light wavelength component. In case of the holographic notch filter, the notch region is preferably symmetrical with a bandpass region of the excitation light source part.

The inlet port of the photoreceiving part may be an inlet slit of a spectroscope, or a first end surface of a single-core optical fiber member. When the optical fiber member is employed, its second end surface may be guided to the spectroscope or the photodetector.

The distance between the lens of the converging optical adjusting part having chromatic aberration and the inlet port is preferably variable, so that a wavelength maximizing a photoreceiving density can be changed.

In order to improve generation efficiency of anti-Stokes-Raman scattered light, the sample part preferably comprises a spherical cell and an integrating sphere type cell holder having a reflecting surface as a portion for holding the cell.

In order to improve reproducibility of measured data by correcting intensity change of light source light, the apparatus preferably further comprises an optical system for detecting a part of the excitation light as a reference light, so that detected intensity of anti-Stokes-Raman scattered light is corrected by that of the reference light.

When the apparatus further comprises a data processing part for multiplying Boltzmann distribution indicating the existence probability of anti-Stokes-Raman scattering by a photoreceiving density reinforcing effect of anti-Stokes-Raman scattering by the present invention and correcting the result for making an operation so that photosensitivity for the anti-Stokes-Raman scattered light is constant over a prescribed range on a shorter wavelength side than the excitation light wavelength, accuracy of quantitative analysis is desirably improved.

The measuring method according to the present invention is adapted to measure a vital substance or another substance through an anti-Stokes-Raman line, whereby Raman scattering of the substance can be measured through a laser beam of 1064 nm, for example, serving as the excitation light since the anti-Stokes-Raman line appears on a shorter wavelength side than the excitation light even if the sensitivity of a detector is merely up to 1000 nm. Thus, an employable range of the detector is widened.

When the inventive method is employed for measuring a readily fluorescing sample such as a vital sample, it is not necessary to select the wavelength of a laser light source for avoiding fluorescence, and Raman scattering measurement can be performed with a relatively low-priced laser having high oscillation energy while avoiding fluorescence. Since laser units having high oscillation energy are limited to a few kinds of oscillation wavelengths, it is an advantage to be capable of selecting the excitation wavelength without avoiding fluorescence in utilizing the high oscillation energy laser units.

Since fluorescence can be avoided, the signal-to-noise ratio is improved, and measurement of a small amount of sample is enabled. A vital substance sample may be obtainable by only a small amount, and hence the present invention is particularly useful for vital substance measurement.

The measuring apparatus according to the present invention is adapted to irradiate a sample with excitation light of a single wavelength, converge scattered light generated from the sample by a lens having chromatic aberration and receive the light on a position closer to the lens than an imaging position by light of an excitation light wavelength on the optical axis of the lens for improving a photoreceiving density of anti-Stokes-Raman scattered light on a shorter wavelength side than the excitation light wavelength, whereby measurement of anti-Stokes-Raman scattered light by an ordinary Raman measuring apparatus, which has been regarded as difficult in general, is enabled.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 2:
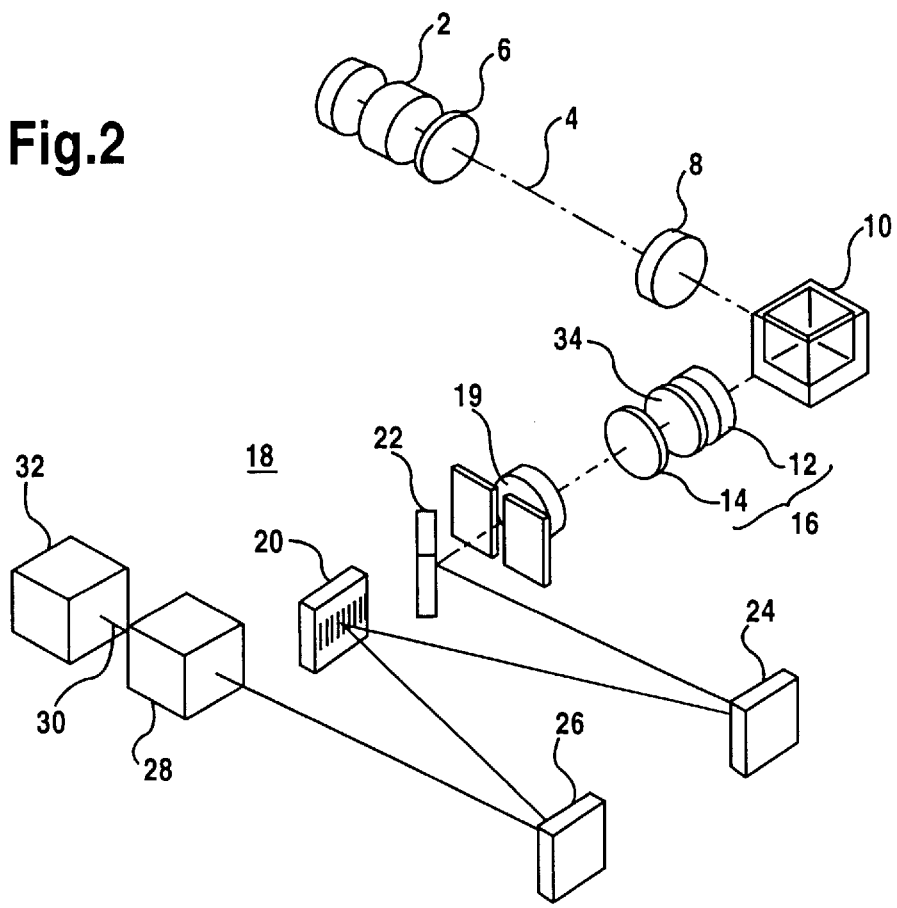
FIG. 2 is a perspective view schematically showing an apparatus according to the present invention.

FIG. 2 is a schematic block diagram showing an apparatus according to the present invention. Numeral 2 denotes an excitation light source, which is suitably prepared from a high oscillation energy laser unit such as an argon ion laser (514.5 nm and 100 mW), for example. An excitation beam 4 from the laser 2 is passed through a bandpass filter 6 so that its sideband is removed, and is applied to a sample in a sample chamber 10 by a collimator lens 8. The sample is stored in a cell if the sample is a liquid or a gas, while no such cell is required if the sample is a solid.

A converging optical adjusting part 16 is provided for receiving and adjusting scattered light from the sample. The converging optical adjusting part 16 comprises a camera lens 12 and a converging lens 14, for example. The camera lens 12, which is adapted to receive the scattered light generated from the sample excited by the excitation beam 4 in a direction of 90 degrees and convert the scattered light to parallel beams, is a compound lens made of a material having small chromatic aberration. In general, a camera lens is so designed that the chromatic aberration is minimized, and such a general camera lens can be employed here. The camera lens 12 can preferably convert all wavelength beams of 450 to 650 nm to parallel beams on the assumption that the scattered light generated from the sample is generated from one point. On the other hand, the convergent lens 14, which is a lens having chromatic aberration, is formed by a general lens optical material of BK7, for example. The converging lens 14 receives the parallel beams from the camera lens 12, and converges the beams on focuses responsive to the wavelengths.

An inlet slit 19 of a spectroscope 18 is provided on a focal position of a desired wavelength by the converging lens 14 as an inlet port, and this inlet slit 19 has a width of about 200 $\mu$m. The position provided with the inlet slit 19 is that where anti-Stokes-Raman scattered light to be detected is converged.

The spectroscope 18 is a single spectroscope employing a diffraction grating 20 of 300 G/mm having a blaze wavelength of 500 nm, and its resolution is 6.8 $cm^{-1}$ (0.18 nm/pixel). In this spectroscope 18, numerals 22, 24 and 26 denote mirrors respectively.

A detector 28, which is a CCD image pickup device (by EG&G, U.S.A., wavelength: 200 to 1100 nm) of 256 by 1024 pixels of a liquid nitrogen cooled type (EEV device), simultaneously receives and detects multiple wavelengths separated by the spectroscope 18. A polychrometer is formed by the spectroscope 18 and the detector 28.

Detection signals of the detector 28 are transferred to a personal computer 32 serving as a data processor through an optical fiber member 30, to be data-processed.

Referring to FIG. 2, a holographic notch filter 34 including an excitation beam wavelength in its notch region is arranged between the camera lens 12 and the condensing lens 14, in order to remove an excitation beam component from the scattered light. The holographic notch filter is available on Kaiser Optical Systems, Inc. (U.S.A.), for example. This holographic notch filter 34 has characteristics of completely blocking off wavelength light included in the notch region while transmitting at least 80% of light in wavelength regions other than the notch region.

Figure 3A:
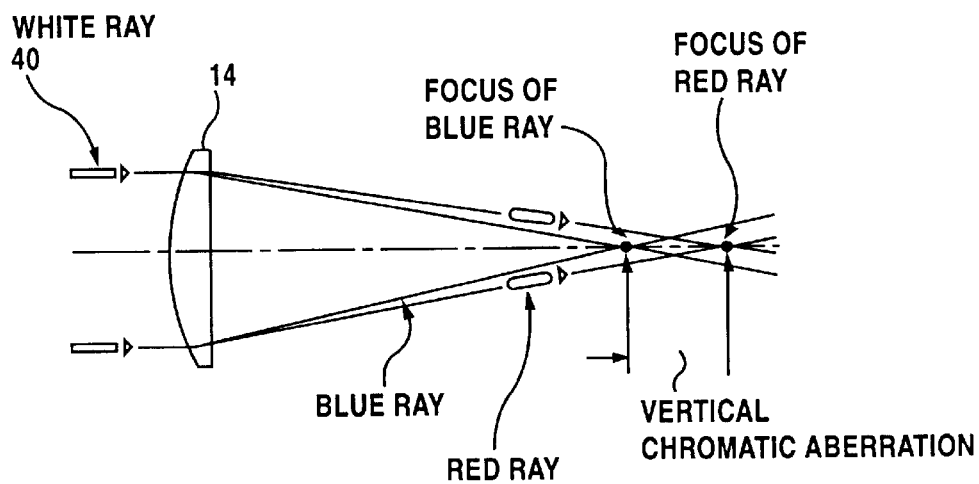
FIGS. 3A and 3B show functions of a converging lens which is provided on an optical adjusting part along with a camera lens for converting an incident light to a parallel beam, and a converging lens which is independently provided on the optical adjusting part respectively.
Figure 3B:
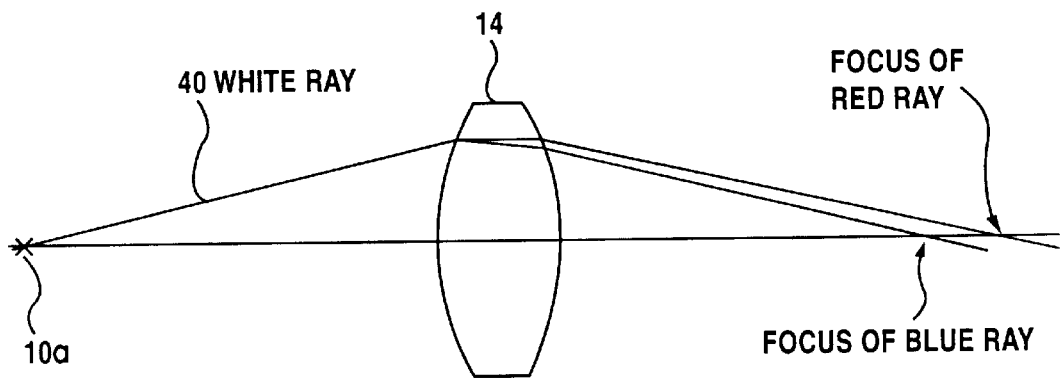

FIGS. 3A and 3B are adapted to illustrate the function of the converging lens 14.

FIG. 3A corresponds to an optical system of FIG. 2. The camera lens 12 converts the scattered light generated from the sample 10 to parallel beams 40, which are incident upon the converging lens 14. The parallel beams 40 of white rays incident upon the converging lens 14 having chromatic aberration form images on positions which are varied with wavelengths. According to the present invention, displacements of focal positions depending on the wavelengths at the converging lens 14 are utilized and the small inlet port is arranged on a position for converging anti-Stokes-Raman scattered light, thereby improving a photoreceiving density of the anti-Stokes-Raman scattered light.

In the optical adjusting part, the camera lens 12 may be omitted so that the converging lens 14 having chromatic aberration directly receives the scattered light generated from the sample. FIG. 3B shows the function of the converging lens 14 in case of omitting the camera lens 12. The converging lens 14 is arranged on a position separated from a scattered light generating point 10a of the sample by twice the focal length or a larger distance, and forms images of the scattered light generating point 10a on positions varied with the wavelengths. Also in this case, it is possible to improve the photoreceiving density of the anti-Stokes-Raman scattered light by utilizing displacements of focuses varied with the wavelengths at the converging lens 14 and arranging the small inlet port on the position for converging the anti-Stokes-Raman scattered light.

Figure 4:
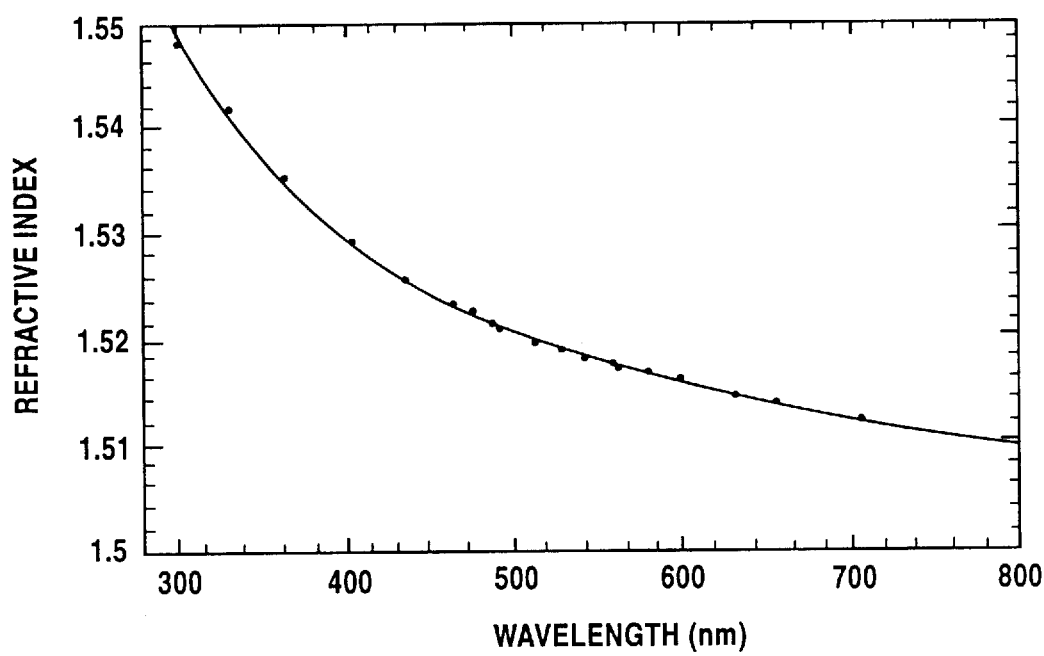
FIG. 4 is a graph showing refractive indices varied with wavelengths of a lens optical material BK7.

The material for the converging lens 14 having chromatic aberration can be prepared from optical glass such as BK7, synthetic quartz, sapphire or SF11. FIG. 4 illustrates refractive index variations with wavelengths in case of utilizing a general lens optical material of BK7. The refractive index is remarkably varied in the range of 300 to 700 nm. This also applies to other optical glass materials.

When an argon ion laser is employed as an excitation light source for measuring Raman scattering spectra, a region of −4000 to 4000 $cm^{-1}$ (negative region: anti-Stokes-Raman scattering spectrum) corresponds to 420 to 650 nm in wavelength. Namely, the region of an anti-Stokes line is favorably remarkably influenced by the chromatic aberration of the converging lens, and the chromatic aberration can be effectively utilized.

When the chromatic aberration of the lens is utilized, it is possible to introduce light of a region having a longer wavelength than the excitation light into the inlet slit while lowering a photoreceiving density, and to introduce light of a region having a shorter wavelength than the excitation light into the inlet slit while increasing an optical density. Expressed in Raman scattering spectrum, light can be introduced into the inlet slit while increasing a photoreceiving density of an anti-Stokes line as compared with that of a Stokes line.

Table 1 shows distances of focal displacements by wavelength aberration of incident light in case of making the focal length of the converging lens 10 mm (value at a wavelength of 500 nm). Numerical values in Table 1 express focal positions (mm).

TABLE 1

| Type of Optical Material | Wavelength (nm) | | | | | | |
| --- | --- | --- | --- | --- | --- | --- | --- |
| | 300 | 400 | 450 | 500 | 550 | 600 | 700 |
| BK7 | 9.507 | 9.650 | 9.755 | 10.000 | 10.062 | 10.105 | 10.166 |
| Synthetic Quartz | 9.507 | 9.650 | 9.755 | 10.000 | 10.062 | 10.105 | 10.166 |
| Sapphire | 9.507 | 9.656 | 9.755 | 10.000 | 10.062 | 10.105 | 10.166 |
| SF11 | 9.507 | 9.650 | 9.755 | 10.000 | 10.062 | 10.105 | 10.166 |

Figure 5A:
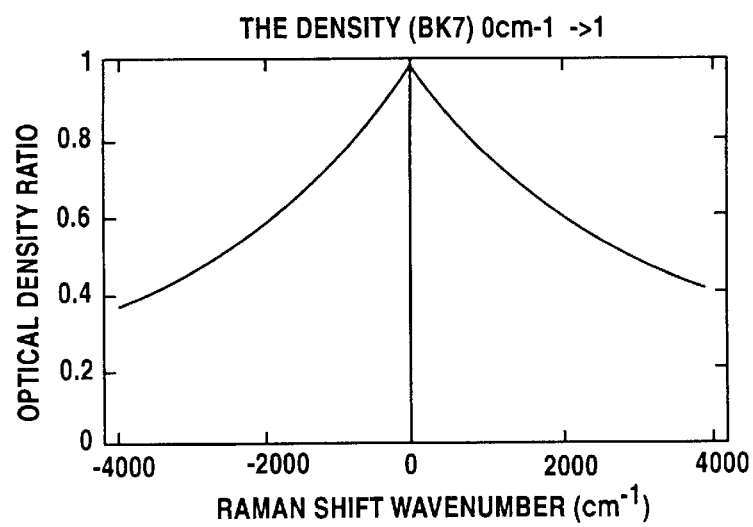
FIGS. 5A, 5B and 5C illustrate optical density ratios at respective Raman shift wavenumber positions in case of making photoreceiving positions different.
Figure 5B:
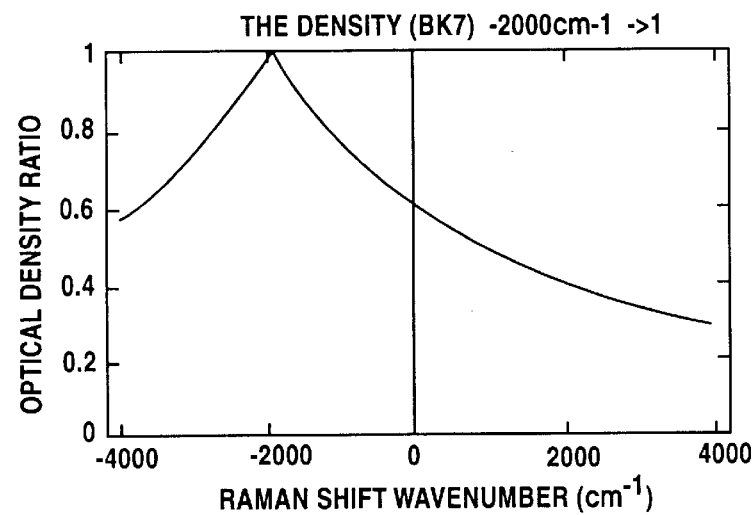
Figure 5C:
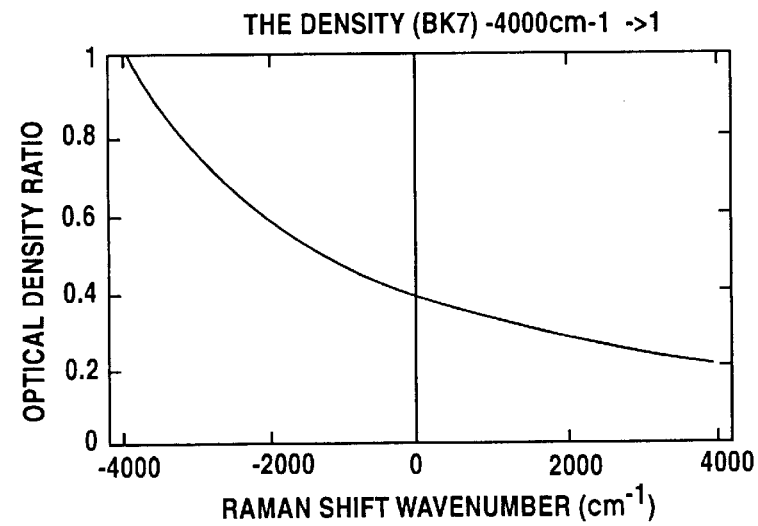

FIGS. 5A to 5C show optical densities on focuses calculated from distances of displacement lengths by the aberration of Table 1. FIG. 5A shows results of density ratios obtained by assuming that light of 500 nm in wavelength forms a circular image of 200 µm in diameter on the focus, calculating sizes (areas) of images formed by beams of other wavelengths (expressed in Raman shift wavenumbers) on the imaging position of the light of 500 nm in wavelength and assuming that the density of the light of 500 nm in wavelength is 1. FIGS. 5B and 5C show results obtained by similarly making calculation at focal positions of beams of $-2000$ cm$^{-1}$ and $-4000$ cm$^{-1}$ in shift wavenumber respectively and assuming that the densities of the respective wavelength beams are 1. Wavenumber 0 cm$^{-1}$ shows an excitation light wavelength, a minus side shows an anti-Stokes-Raman region, and a plus side shows a Stokes-Raman and fluorescence region. In the example of FIG. 5B, the density ratio is not more than ½ on a longer wavelength side of at least 1000 cm$^{-1}$ in shift wavenumber. Thus, it is possible to reduce the fluorescence density and increase the anti-Stokes-Raman scattered light density by placing the inlet port on a focal position on a shorter wavelength side than the excitation wavelength.

As understood from FIGS. 5A to 5C, it is possible to arbitrarily select a wavelength received in the maximum density by making the distance between the converging lens 14 and the inlet port such as the inlet slit 19 variable.

Figure 1:
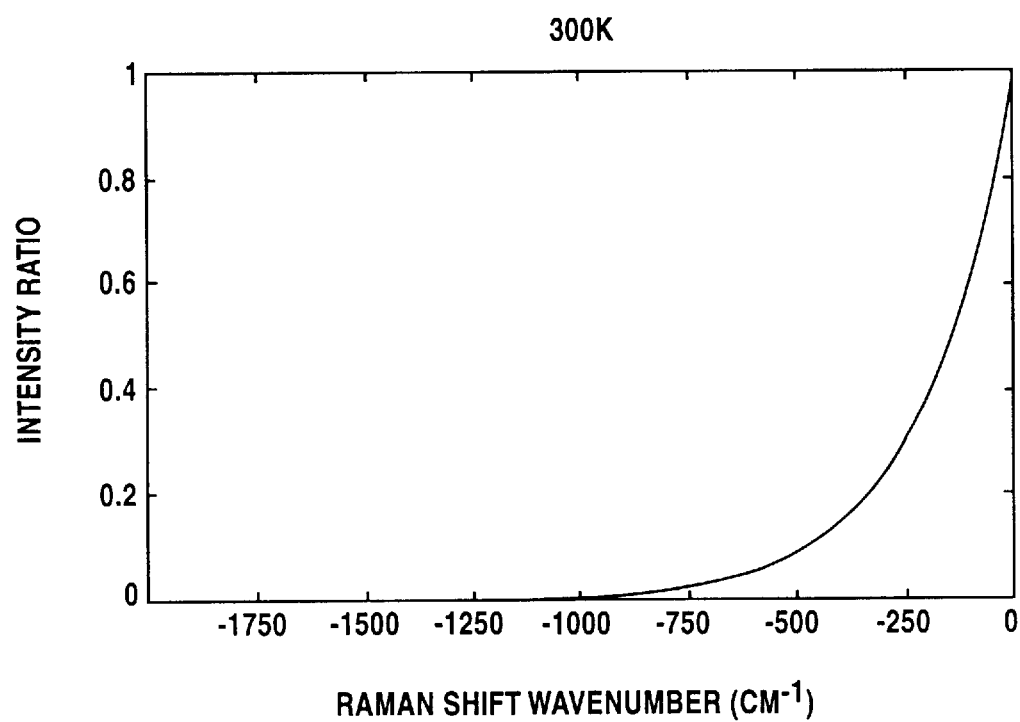
FIG. 1 illustrates calculated values of intensity ratios of anti-Stokes-Raman and Stokes-Raman lines on the assumption that an absolute temperature is 300 K on the basis of Boltzmann distribution.
Figure 6A:
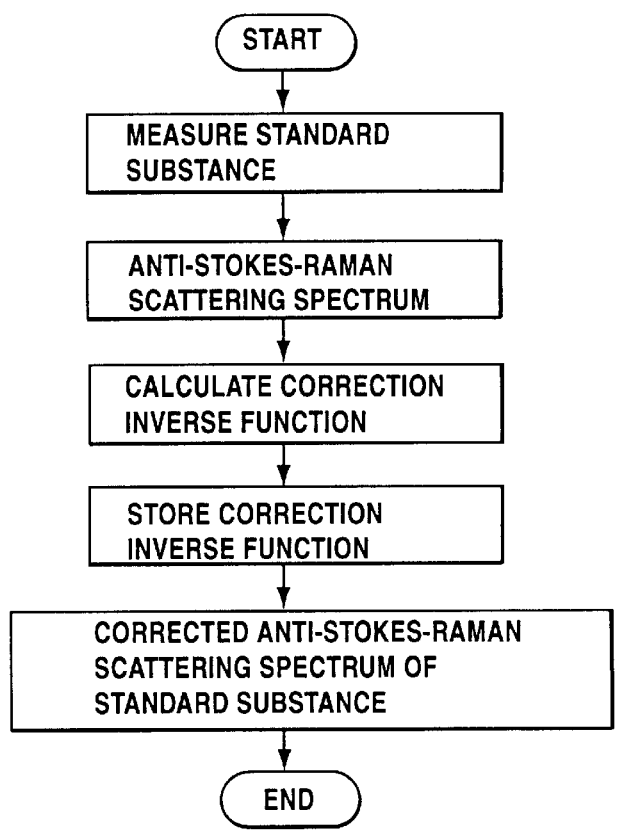
FIGS. 6A and 6B are flow charts respectively showing a process of calculating a correction inverse function through a standard substance and storing the same and a process of measuring an unknown sample for making photosensitivity for an anti-Stokes-Raman scattering spectrum constant.
Figure 6B:
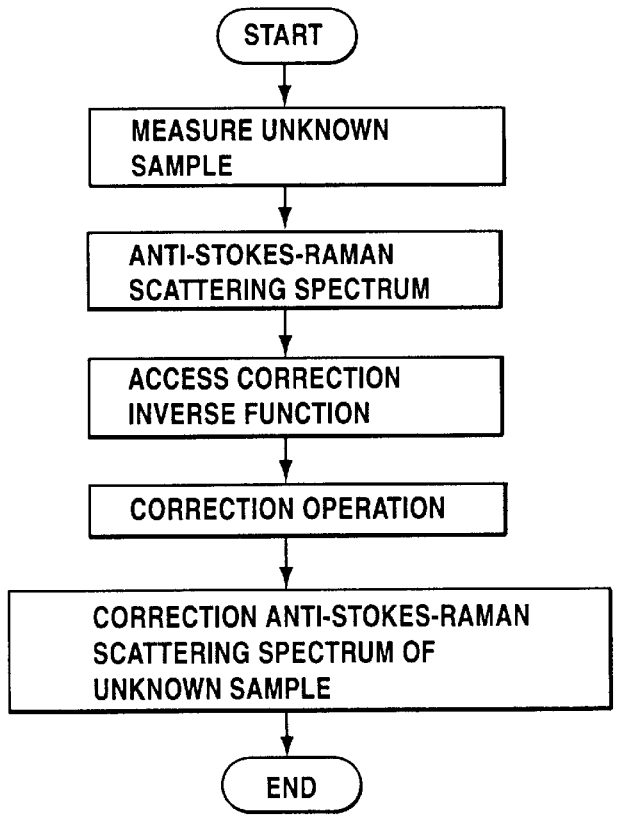

It is possible to provide the personal computer 32 implementing a data processing part with a function of multiplying the Boltzmann distribution of FIG. 1 showing the existence probability of anti-Stokes-Raman scattering by a photoreceiving density reinforcing effect (FIGS. 5B and 5C) on a shorter wavelength side than the excitation light wavelength due to the arrangement of the inlet port for the spectroscope and correcting the result for making an operation so that photosensitivity for the anti-Stokes-Raman scattered light is constant over a prescribed range on a shorter wavelength side. FIGS. 6A and 6B show processes for implementing this function.

FIG. 6A shows the process of making photosensitivity of anti-Stokes-Raman scattered light constant. The inlet port for the spectroscope is arranged on the focal position by the light of the shorter wavelength than the excitation light wavelength, and a standard substance is measured to obtain an anti-Stokes-Raman scattered light spectrum. A correction inverse function is calculated so that the sensitivity for the spectrum is constant over a prescribed range, and stored. The measured anti-Stokes Raman scattered light spectrum is corrected with the correction inverse function, and outputted.

Then, the inlet port for the spectroscope is arranged on the same position as that for measuring the standard substance for measuring an unknown sample and obtaining an anti-Stokes-Raman scattered light spectrum, as shown in FIG. 6B. The correction inverse function is accessed for performing a correction operation on the spectrum, thereby obtaining an anti-Stokes-Raman scattered light spectrum of the unknown sample which is so corrected that photosensitivity is constant.

Thus, performance of quantitative analysis through spectral intensity or a spectral peak area is simplified by making correction so that the photosensitivity is constant.

While the photoreceiving part comprises the spectroscope for separating the scattered light incident from the inlet port into its spectral components in the measuring apparatus shown in FIG. 2, a bandpass filter for transmitting only a shift wavenumber of anti-Stokes-Raman scattered light to be detected may alternatively be provided on the converging optical adjusting part 16 so that the photoreceiving part detects the scattered light incident from the inlet port in the photodetector without separating the scattered light into its spectral components.

Figure 7:
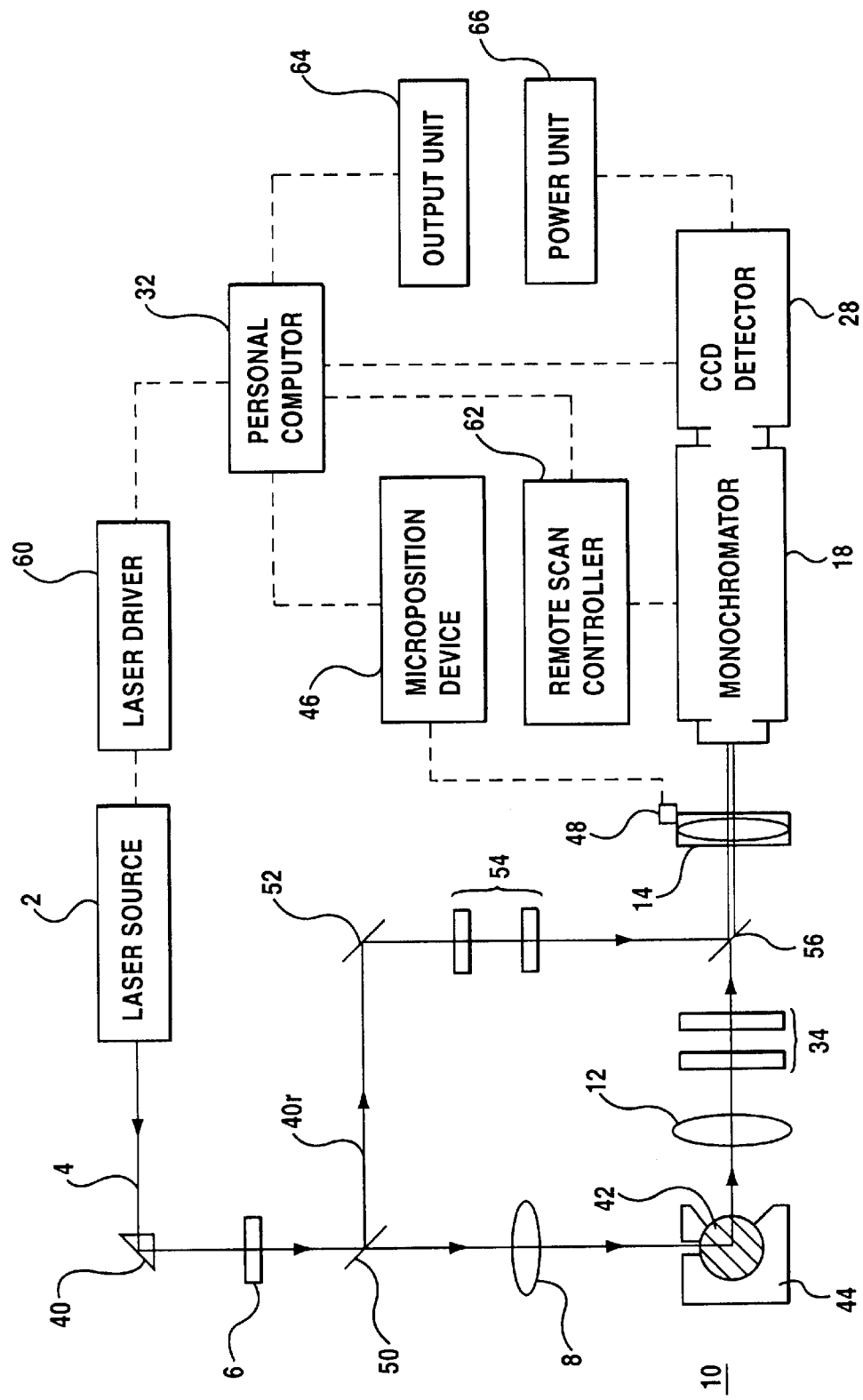
FIG. 7 is a block diagram showing an embodiment of a measuring apparatus.
Figure 8:
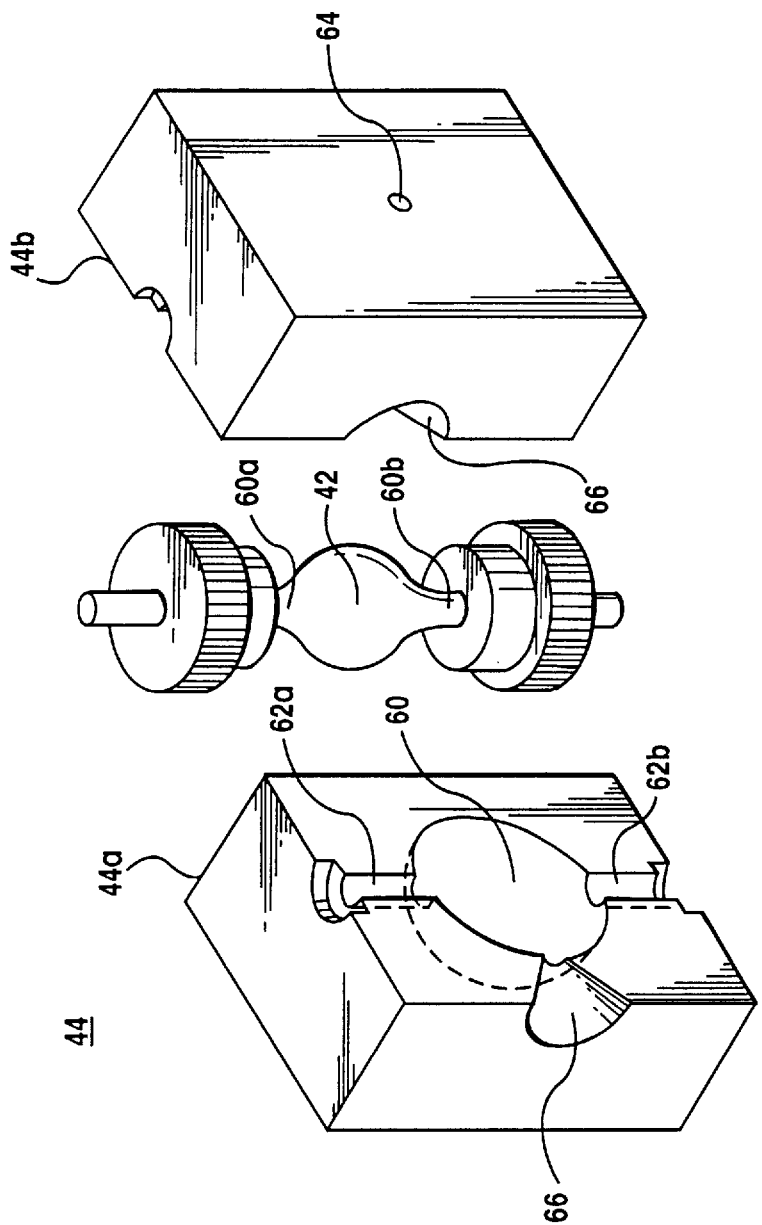
FIG. 8 is an exploded perspective view showing a cell and a cell holder employed in the measuring apparatus shown in FIG. 7.

FIGS. 7 and 8 show a measuring apparatus employed for performing actual measurement. Portions identical to those in FIG. 2 are denoted by the same reference numerals.

Referring to FIG. 7, the optical path of an excitation beam 4 emitted from a laser unit serving as an excitation light source 2 is bent by a prism 40, so that the excitation beam 4 is converted to a narrow beam through a bandpass filter 6 and a collimator lens 8 and applied to a sample in a sample chamber 10. The sample chamber 10 comprises a spherical quartz flow cell 42 and a integrating sphere type cell holder 44 holding the flow cell 42, as described later with reference to FIG. 8 in detail.

A converging optical system for converging scattered light which is generated from the sample irradiated with the excitation beam in the flow cell 42 comprises a camera lens 12 having small chromatic aberration serving as an objective lens, a holographic notch filter 34, and a converging lens 14 having chromatic aberration. A spectroscope 18 and a detector 28 are as shown in FIG. 2 in detail.

The converging lens 14 is supported to be movable along its optical axis, and comprises an actuator 48 whose driving is controlled by a micro position device 46 controlled by a personal computer 32, to be capable of approaching to and separating from an inlet slit of the spectroscope 18.

This measuring apparatus is provided with a correction optical system, to be capable of measuring light source intensity and correcting scattered light intensity. This correction optical system comprises a slide glass member 50 of transparent plate glass which is obliquely arranged across an optical path between the bandpass filter 6 and the collimator lens 8 for-taking out a part of the excitation beam 4 as reference light 40r, another slide glass member 52 for bending the optical path of the reference light 40r taken out by the slide glass member 50, neutral density filter 54 for adjusting light quantities, and still another slide glass member 56 obliquely arranged across an optical path between the holographic notch filter 34 and the converging lens 14 for introducing the reference light 40r transmitted through the extinction filters 54 into the spectroscope 18. The reference light 40r is incident upon the spectroscope 18 with scattered light from the sample, and separated into its spectral components along with the scattered light and detected by the detector 28.

The detected intensity of the scattered light is divided by that of the reference light 40r, whereby a scattered light output in which fluctuation of the light source intensity is corrected is obtained.

FIG. 7 further shows a driver 60 for the light source and a remote scan controller 62 for the spectroscope, which are controlled by the personal computer 32. The personal computer 32 also receives detection outputs of the detector 28 for performing data processing thereof, thereby also serving as a data processor. FIG. 7 also shows an output unit 64 for outputting measured data etc. and a power unit 66 for the detector 28.

FIG. 8 shows a cell 42 employed in the sample chamber in this measuring apparatus and a cell holder 44 for holding the cell 42. The cell 42 is a spherical quartz flow cell, which is provided with cylindrical inlet and outlet parts 60a and 60b on both sides of its body. The cell holder 44 of an integrating sphere type consists of two parts 44a and 44b which are combined with each other for holding the cell 42, and comprises an integrating sphere part 60 for holding a spherical part of the flow cell 42, holding parts 62a and 62b communicating with the integrating sphere part 60 for holding the inlet and outlet parts 60a and 60b of the cell 42, an inlet hole 64 for introducing the excitation beam, and an outlet hole 66 outwardly spread for taking out scattered light generated in the cell 42 in a direction at 90 degrees with respect to the incident light direction.

Due to utilization of such an integrating sphere type cell holder, the excitation beam incident through the inlet hole 64 is multiple-reflected by the integrating sphere part 60 for improving excitation efficiency, while the generated scattered light is collected and discharged from the single outlet hole 66, whereby the scattered light is so reinforced that measurement with high sensitivity is enabled.

Measurement examples are now described. The measuring apparatus shown in FIGS. 7 and 8 was employed for irradiating samples with excitation light of argon ion laser beams (wavelength: 514.5 nm, output: 100 mW) from light sources.

Figure 9A:
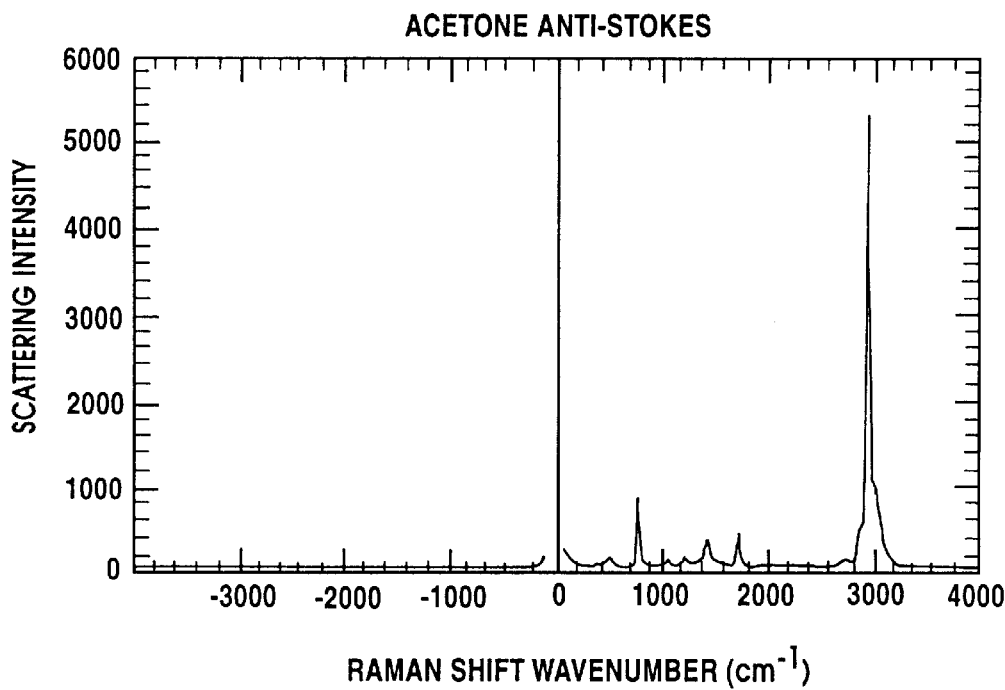
FIGS. 9A and 9B are a diagram showing the Raman scattering spectrum of 99% acetone measured in a conventional apparatus system and an enlarged view thereof respectively.
Figure 9B:
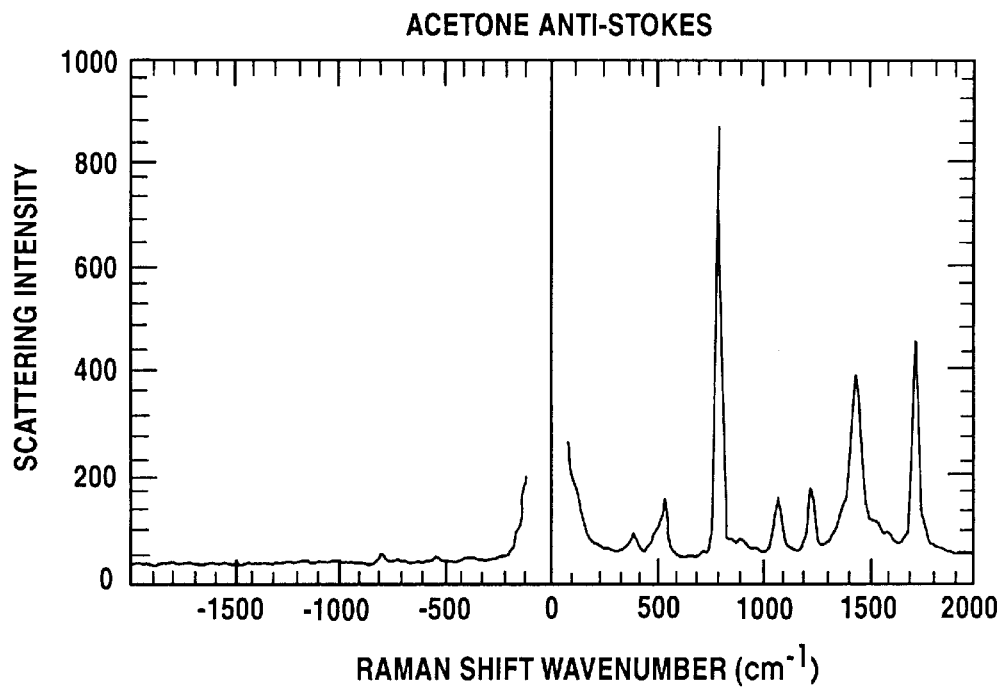

FIGS. 9 shows Raman scattering spectra of 99% acetone measured by a conventional apparatus system. An exposure time of a photodetector is 5 seconds. FIG. 9B is an enlarged view. C=O stretching vibration in the vicinity of 790 $cm^{-1}$ is observed also on an anti-Stokes side. However, its intensity ratio is about 0.024, which excellently coincides with a theoretical value (0.0237) predicted from the Boltzmann distribution.

Spectra in the vicinity of excitation light wavelengths (wavenumber: 0 $cm^{-1}$) are zero not only in FIGS. 9A and 9B but in FIGS. 10A, 10B, 11A and 11B, since excitation light intensity values are not measured by reference light in these spectra and excitation light components are removed by notch filters.

Figure 10A:
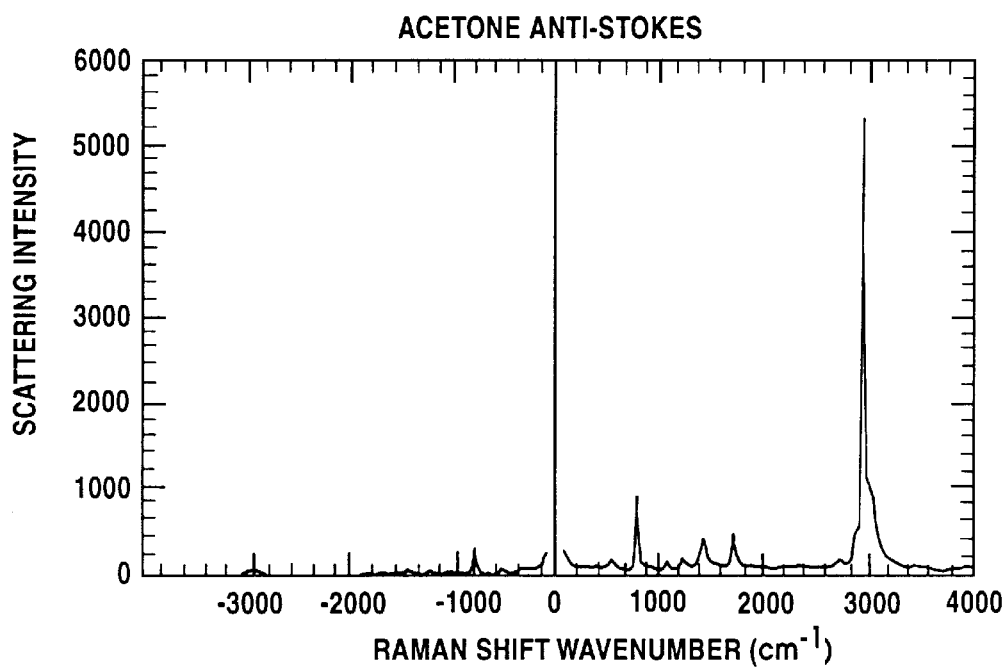
FIGS. 10A and 10B are a diagram showing the Raman scattering spectrum of 99% acetone measured by an apparatus according to an embodiment and an enlarged view thereof respectively.
Figure 10B:
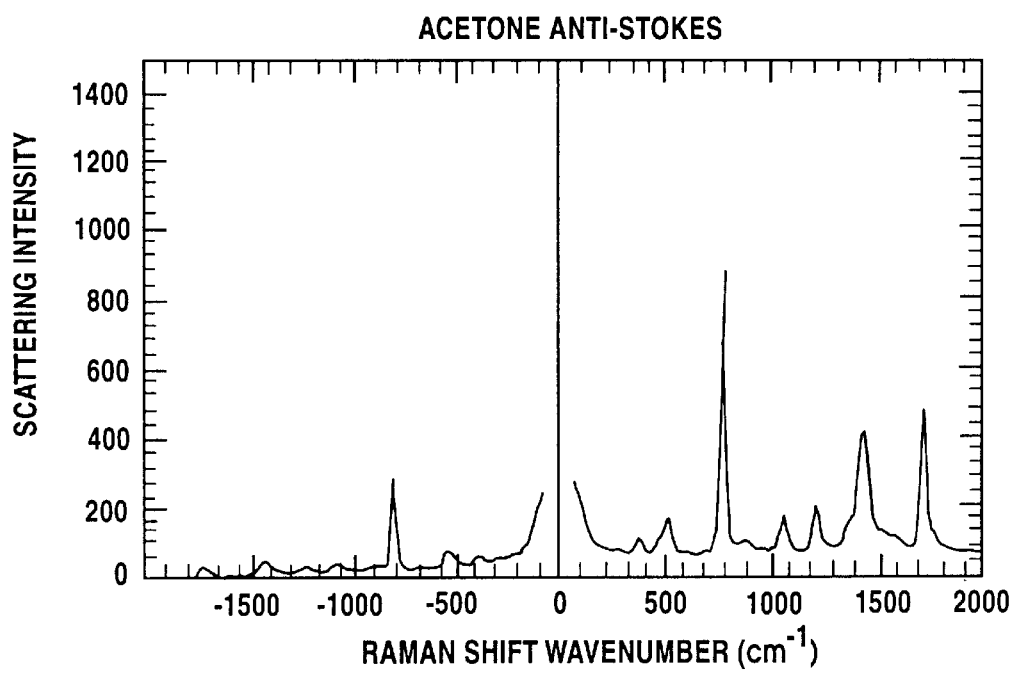

FIGS. 10A and 10B show measurement examples employing the apparatus of FIGS. 7 and 8. The exposure time of the photodetector is 5 seconds. In each of this and following examples, an end surface of a single-core optical fiber member having a diameter of about 200 μm is arranged on the position of an inlet port for receiving scattered light converged by the converging lens 14 and guiding the scattered light to the spectroscope and another end surface thereof is guided to the spectroscope 18. In the measurements of these examples, the position of the converging lens 14 is so adjusted that the position of the inlet port approaches toward the converging lens 14 than an imaging position of an excitation light wavelength by the converging lens 14 to receive a desired anti-Stokes-Raman scattered light in the maximum density. FIG. 10B is a partially enlarged view of FIG. 10A. The intensity ratio of an anti-Stokes-Raman line to a Stokes-Raman line of C=O stretching vibration in the vicinity of 790 $cm^{-1}$ is about 12 times comparing with the result of FIG. 9B.

Figure 11A:
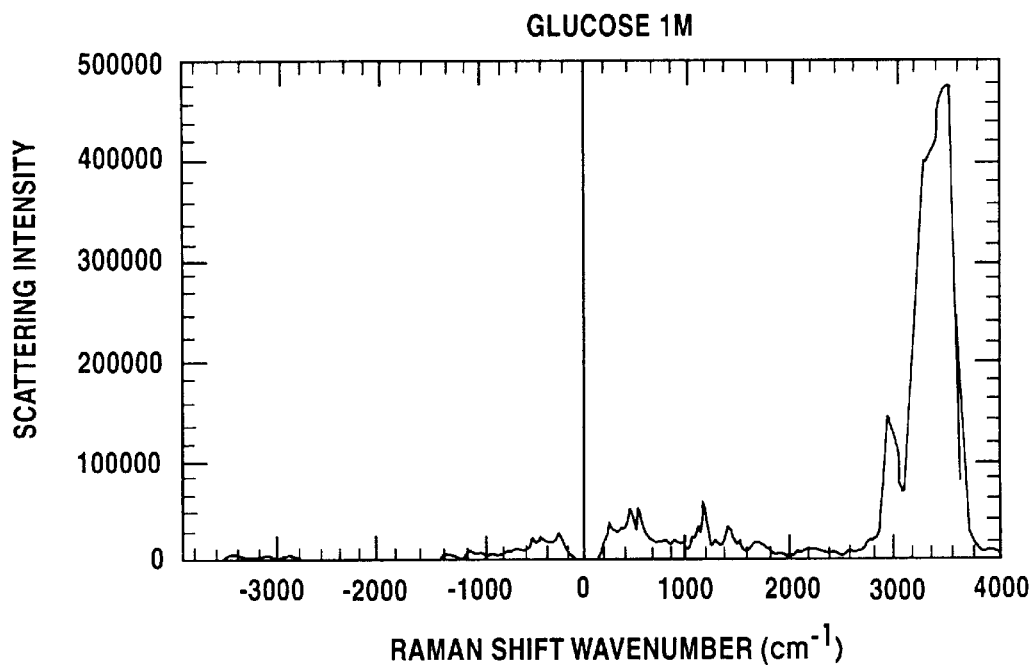
FIGS. 11A and 11B are a diagram showing the Raman scattering spectrum of an aqueous glucose solution of 1M measured by the apparatus of the embodiment and an enlarged view thereof respectively.
Figure 11B:
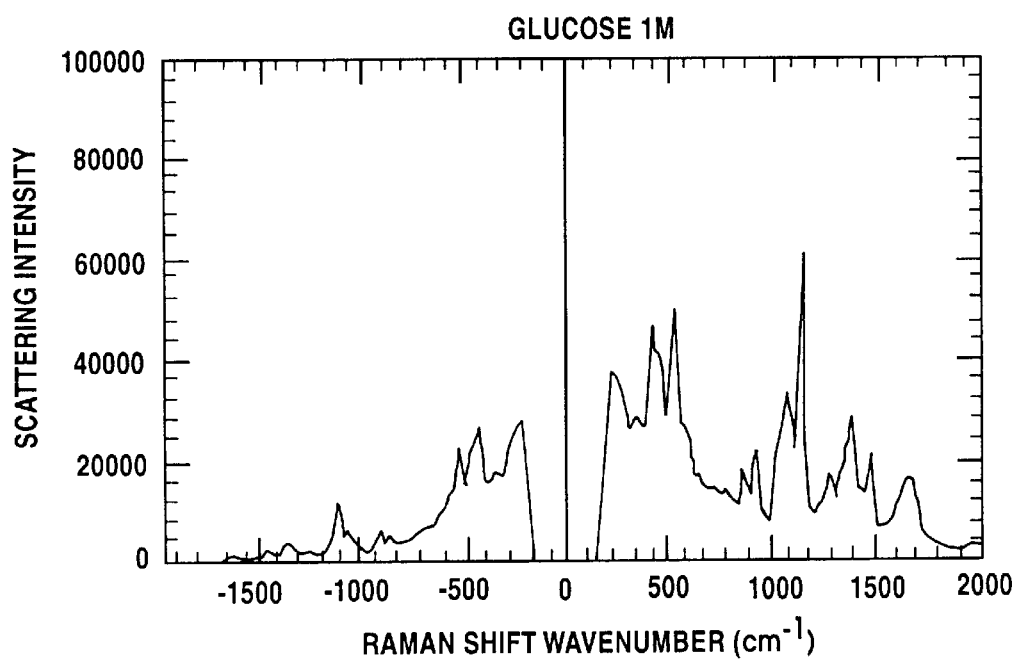

FIGS. 11A and 11B are a diagram showing the overall Raman scattering spectrum of an aqueous glucose solution of 1M measured by the apparatus shown in FIGS. 7 and 8 and an enlarged view showing the range of −2000 to 2000 $cm^{-1}$ respectively. The exposure time of the photodetector is 5 seconds.

From the results shown in FIGS. 11A and 11B, it is understood possible to measure anti-Stokes-Raman scattering of an aqueous glucose solution.

Figure 12:
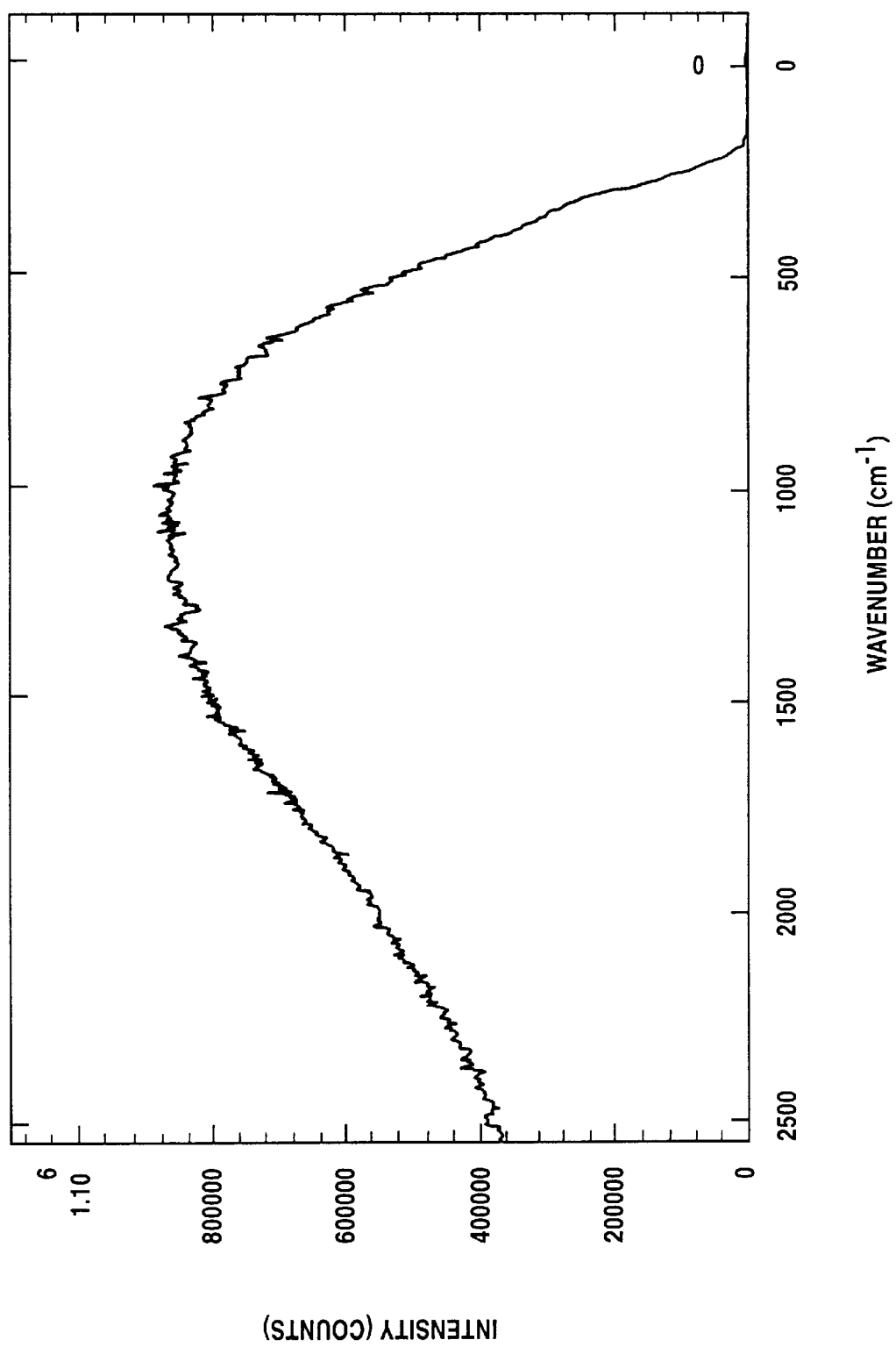
FIG. 12 is a waveform diagram showing the scattering spectrum of human urine.

FIG. 12 illustrates the scattering spectrum of human urine, most of which is fluorescence. In each measurement for obtaining measured data of FIGS. 12 to 30, the exposure time of the photodetector is 1 second.

Figure 13:
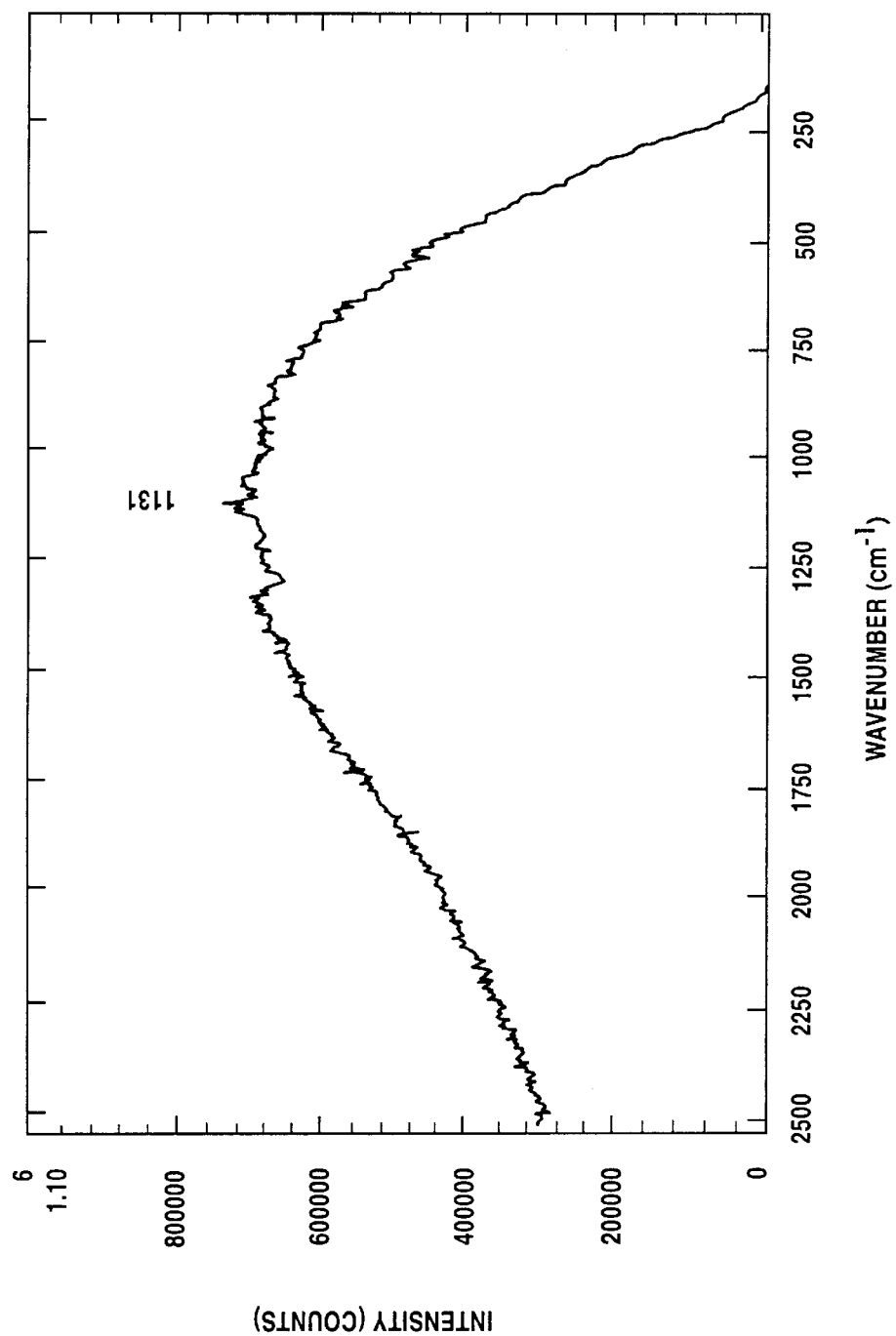
FIG. 13 is a waveform diagram showing the scattering spectrum of a sample prepared from human urine containing 2M of glucose.
Figure 14:
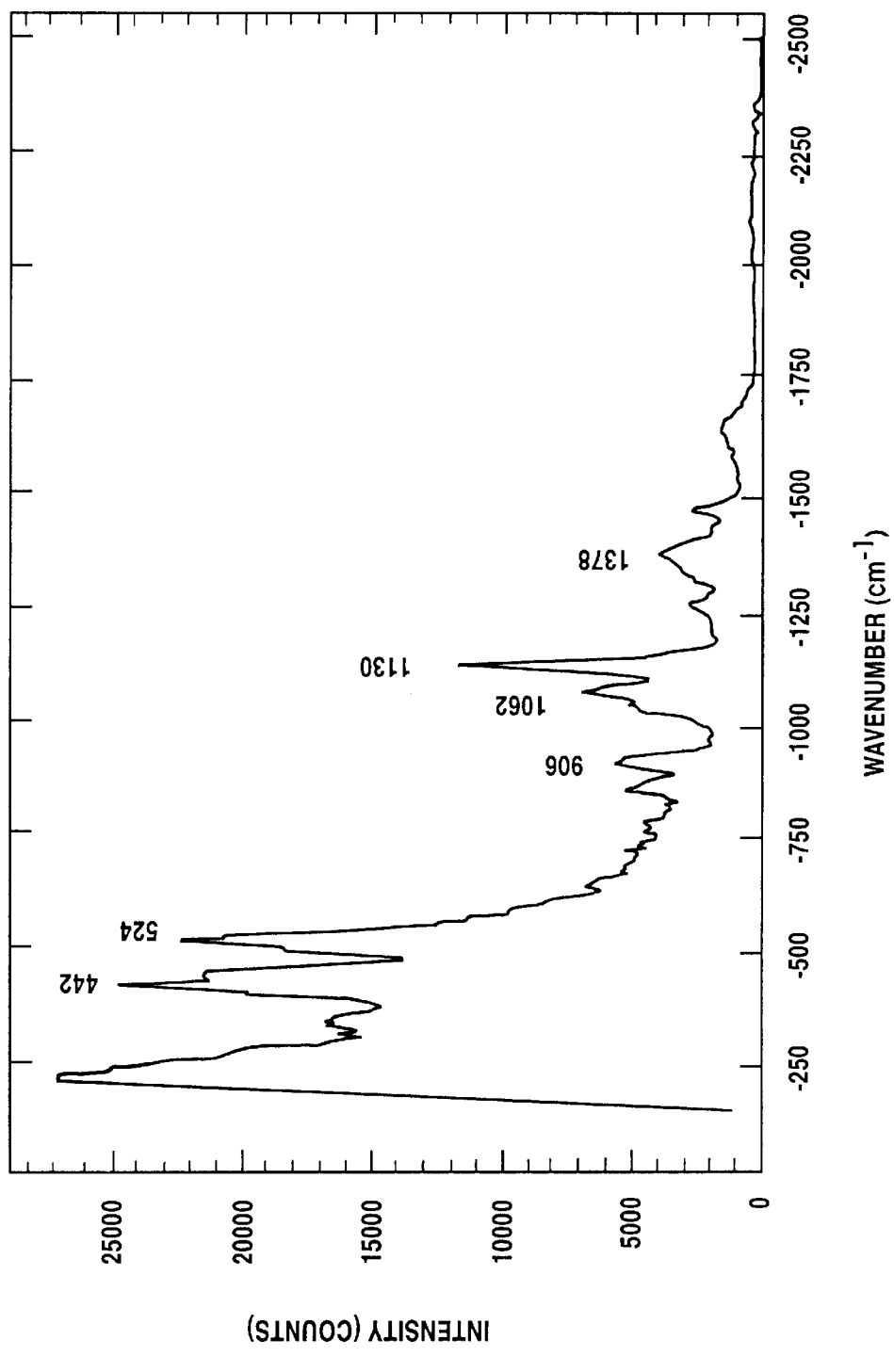
FIG. 14 is a waveform diagram showing the anti-Stokes-Raman scattering spectrum of the same sample as that of FIG. 13.

FIGS. 13 and 14 show scattering spectra of a sample prepared from human urine containing 2M of glucose measured by the apparatus shown in FIGS. 7 and 8. These figures show the scattering spectrum in the range of a longer wavelength side than the excitation light wavelength and the anti-Stokes-Raman scattering spectrum in the range of −200 to −2500 $cm^{-1}$ on a shorter wavelength side respectively.

While Stokes-Raman scattering peaks of FIG. 13 are almost buried under fluorescence, clear peaks are observed in the anti-Stokes-Raman scattering spectrum shown in FIG. 14.

Figure 15:
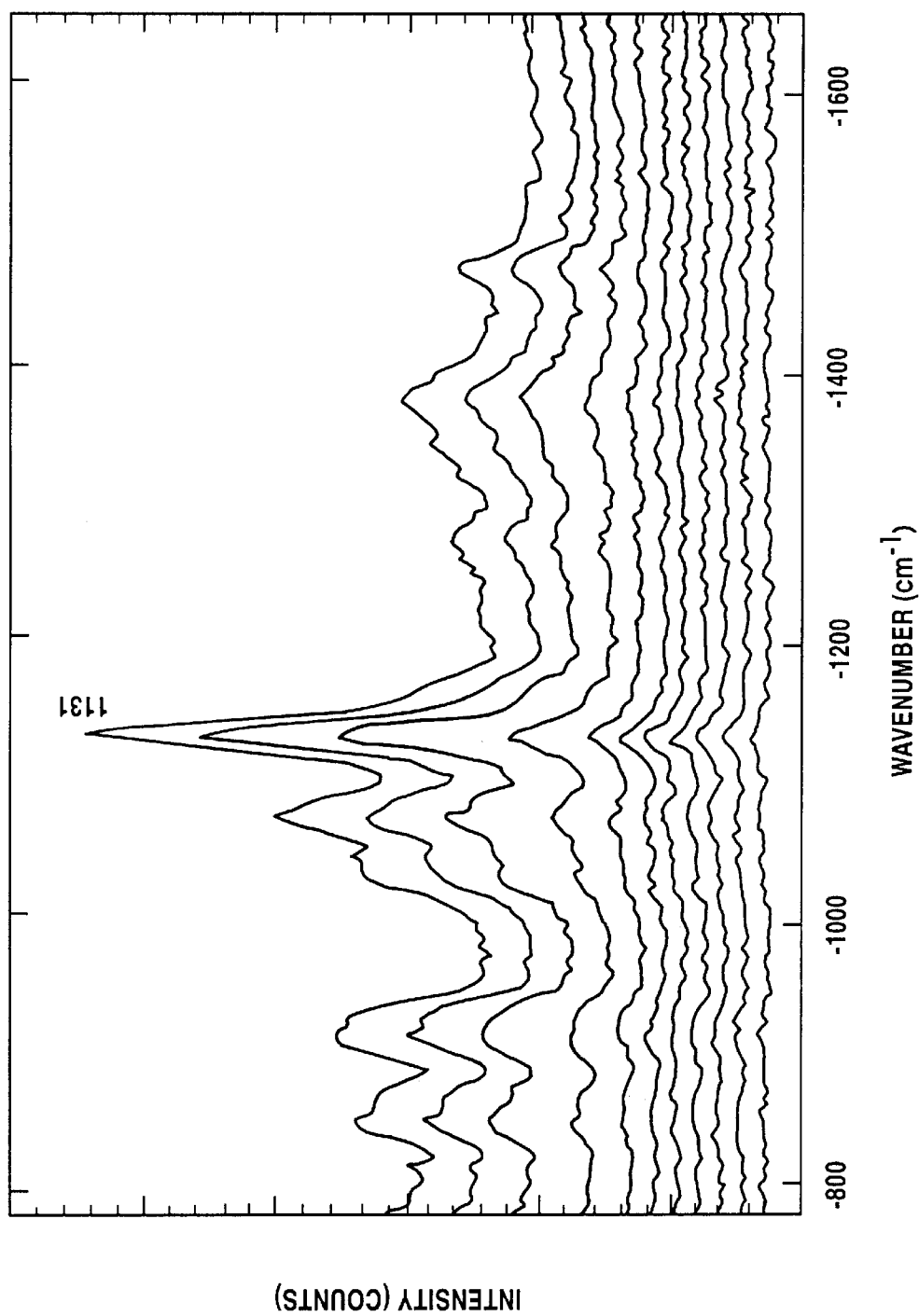
FIG. 15 is a waveform diagram showing the anti-Stokes-Raman scattering spectra of urine samples having different glucose concentrations.

FIG. 15 shows the anti-Stokes-Raman scattering spectra of urine samples having different glucose concentrations measured by the apparatus shown in FIGS. 7 and 8. The samples are prepared by mixing 250 μl of human urine with 11 aqueous glucose solutions of 250 μl having different concentrations so that urogenous glucose concentrations are 32 to 1000 mg/dl (Gluco Card value (by Kyoto Dai-ichi Kagaku Co., Ltd,)).

Figure 16:
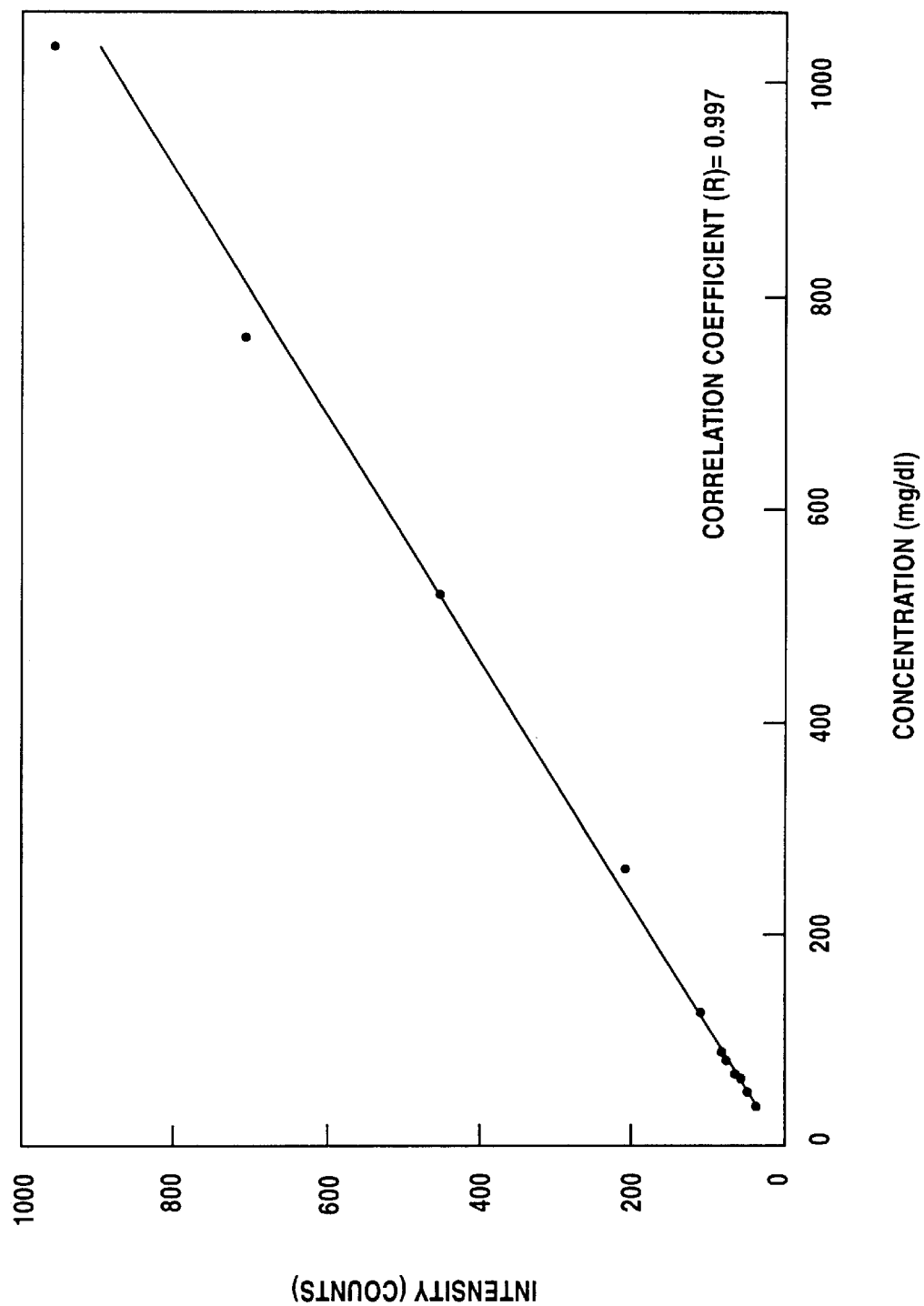
FIG. 16 illustrates the correlation between anti-Stokes-Raman scattering intensity in the vicinity of $-1131$ $cm^{-1}$ and glucose concentrations.

FIG. 16 illustrates the correlation between anti-Stokes-Raman scattering intensity in the vicinity of −1131 $cm^{-1}$ and glucose concentrations. The correlation coefficient R in this case, which is equal to 0.997, indicates that the correlation is remarkably excellent. Urogenous glucose concentrations can be determined by employing the correlation of FIG. 16 as a calibration curve.

Figure 17:
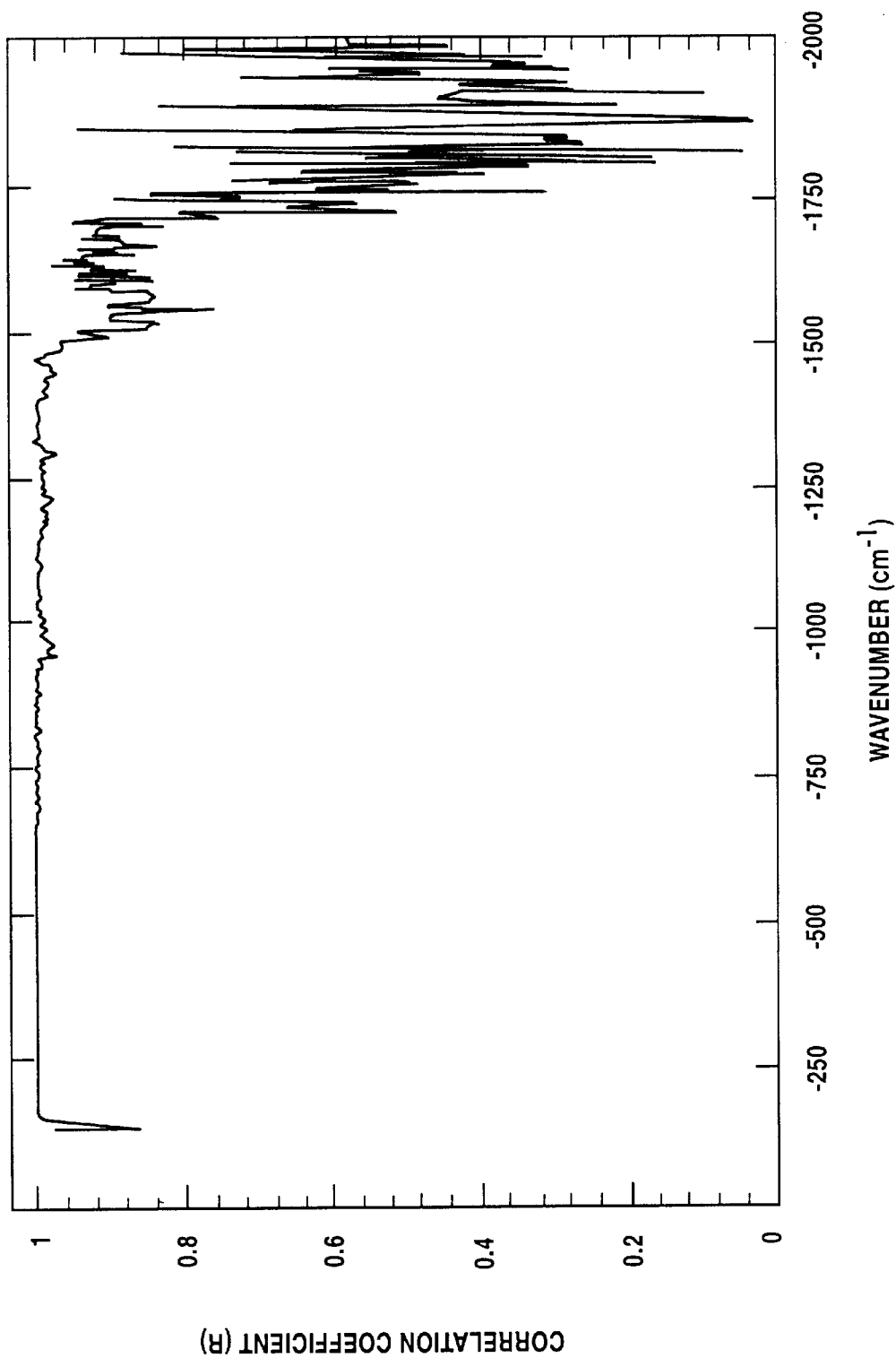
FIG. 17 illustrates correlation coefficients R between anti-Stokes-Raman scattering and glucose concentrations (32 to 1000 mg/dl) at $-2000$ to $-100$ $cm^{-1}$.

FIG. 17 illustrates correlation coefficients R between anti-Stokes-Raman scattering and the glucose concentrations of the mixed samples of urine and the aqueous glucose solutions measured in FIG. 16 at −2000 to −100 $cm^{-1}$. The correlation coefficients R are at least 0.9 over a wide range, whereby it is possible to form a calibration curve in this range for determining urogenous glucose concentrations.

Figure 18:
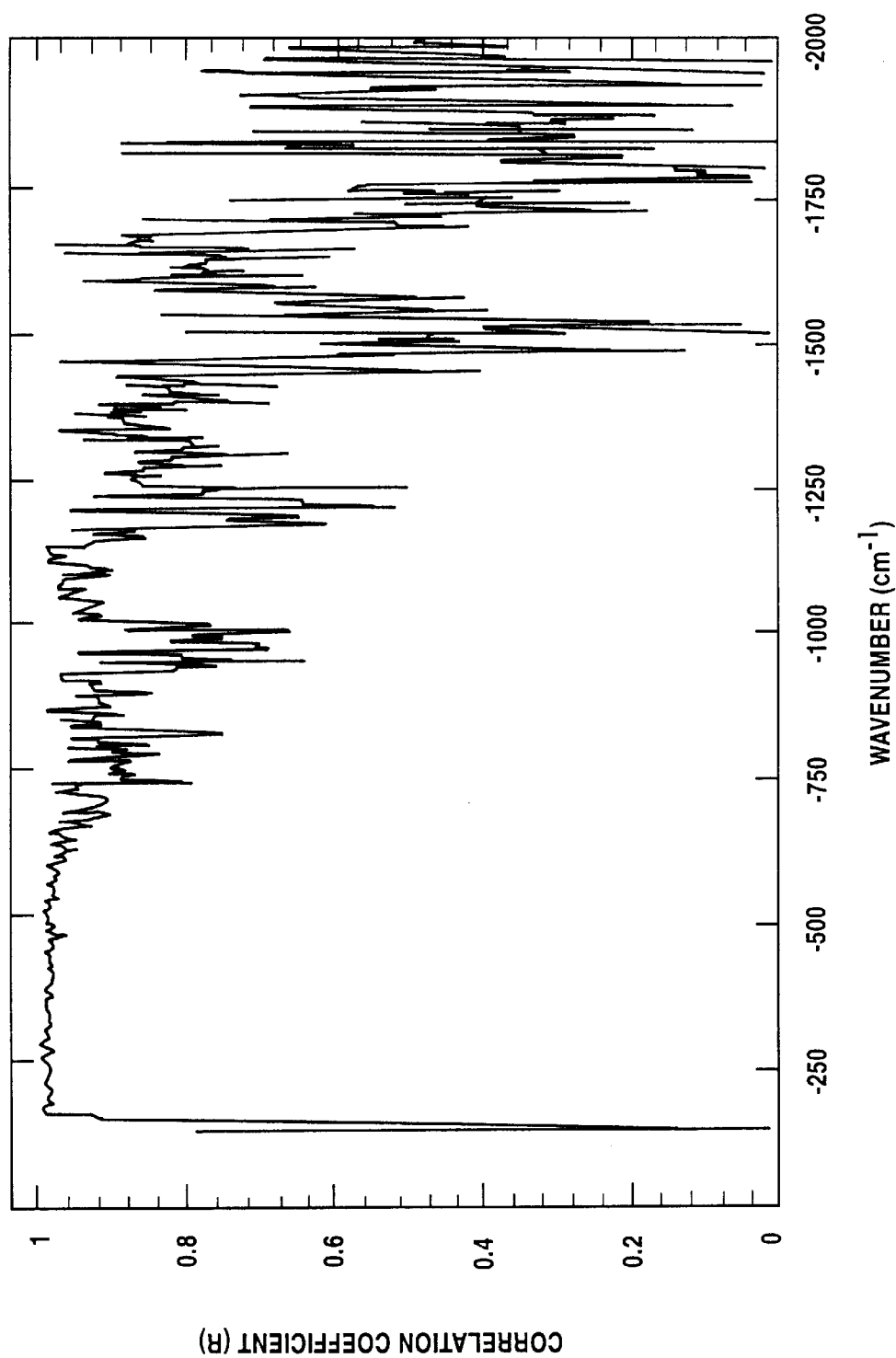
FIG. 18 illustrates correlation coefficients R between anti-Stokes-Raman scattering and glucose concentrations (32 to 514 mg/dl) at $-2000$ to $-100$ $cm^{-1}$.

FIG. 18 illustrates anti-Stokes-Raman shift wavenumber dependency of correlation coefficients R, while the concentration range of the data is narrowed to 32 to 514 mg/dl. The range where the correlation coefficients R are at least 0.9 is narrow.

Figure 19A:
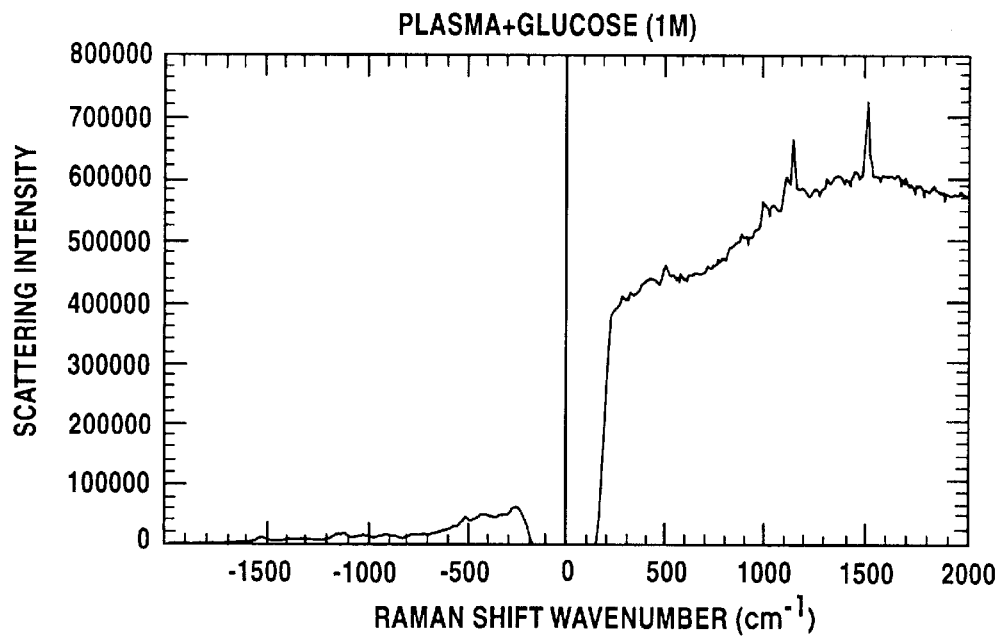
FIGS. 19A and 19B are a diagram showing the Raman scattering spectrum of a sample prepared from human blood plasma containing 1M of glucose measured by the apparatus of the embodiment and an enlarged view thereof respectively.
Figure 19B:
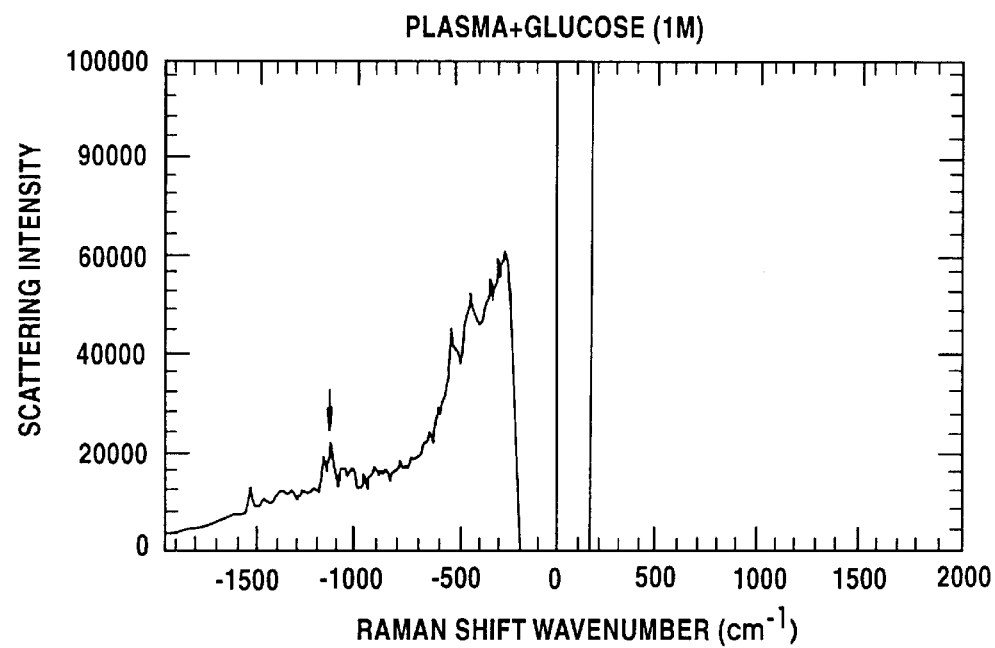

FIGS. 19A shows an anti-Stokes-Raman scattering spectrum of a mixed solution of human blood plasma and an aqueous glucose solution. FIG. 19B is an enlarged view of FIG. 19A.

Figure 20:
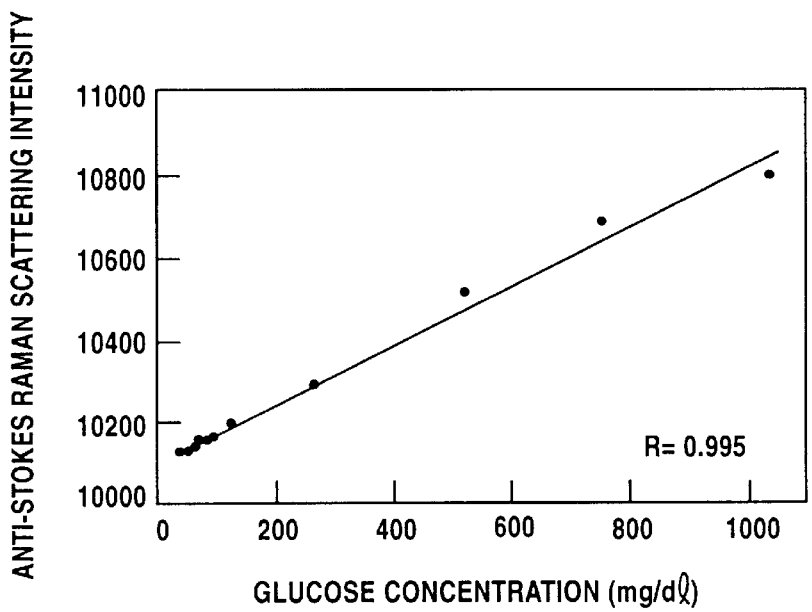
FIG. 20 illustrates correlation coefficients R between anti-Stokes-Raman scattering in the vicinity of $-1130$ $cm^{-1}$ and glucose concentrations.

FIG. 20 illustrates the correlation coefficients R between anti-Stokes-Raman scattering intensity values of the spectrum in the vicinity of −1130 $cm^{-1}$ and glucose concentrations. The samples are prepared by mixing 250 μl of human blood plasma with 12 aqueous glucose solutions of 250 μl having different concentrations so that urogenous glucose concentrations are 41, 53, 66, 70, 85, 95, 126, 265, 520, 756 and 1036 mg/dl (Gluco Card value (by Kyoto Dai-ichi Kagaku Co., Ltd.)) and 0.5M respectively. The correlation coefficient R in this case, which is equal to 0.995, indicates that the correlation is remarkably excellent. Urogenous glucose concentrations can be determined by employing the correlation of FIG. 20 as a calibration curve.

Figure 21:
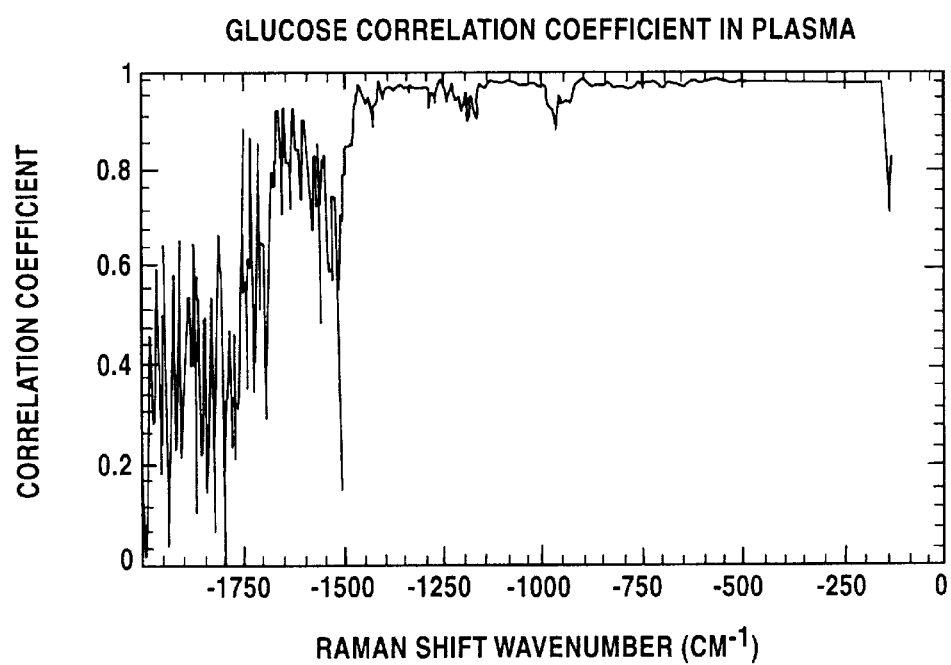
FIG. 21 illustrates correlation coefficients between glucose concentrations in human blood plasma and anti-Stokes-Raman scattering at $-2000$ to $0$ $cm^{-1}$.

FIG. 21 shows a graph of correlation coefficients between glucose concentrations in human blood plasma and anti-Stokes-Raman scattering at −2000 to 0 cm$^{-1}$. The correlation coefficients R are at least 0.9 over a wide range, whereby it is possible to form a calibration curve in this range for determining urogenous glucose concentrations.

Figure 22:
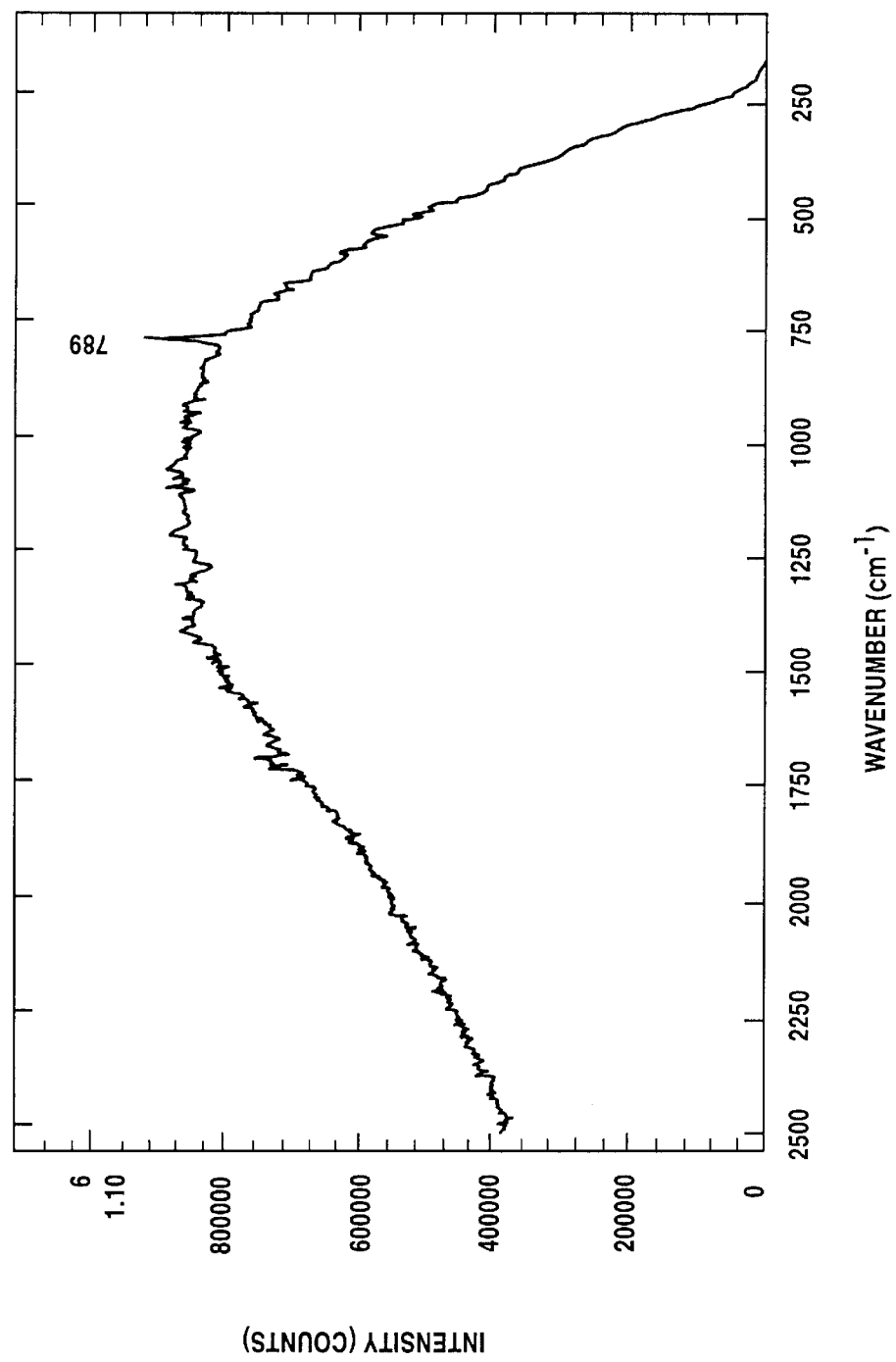
FIG. 22 illustrates the scattering spectrum of a sample prepared from human urine containing acetone.
Figure 23:
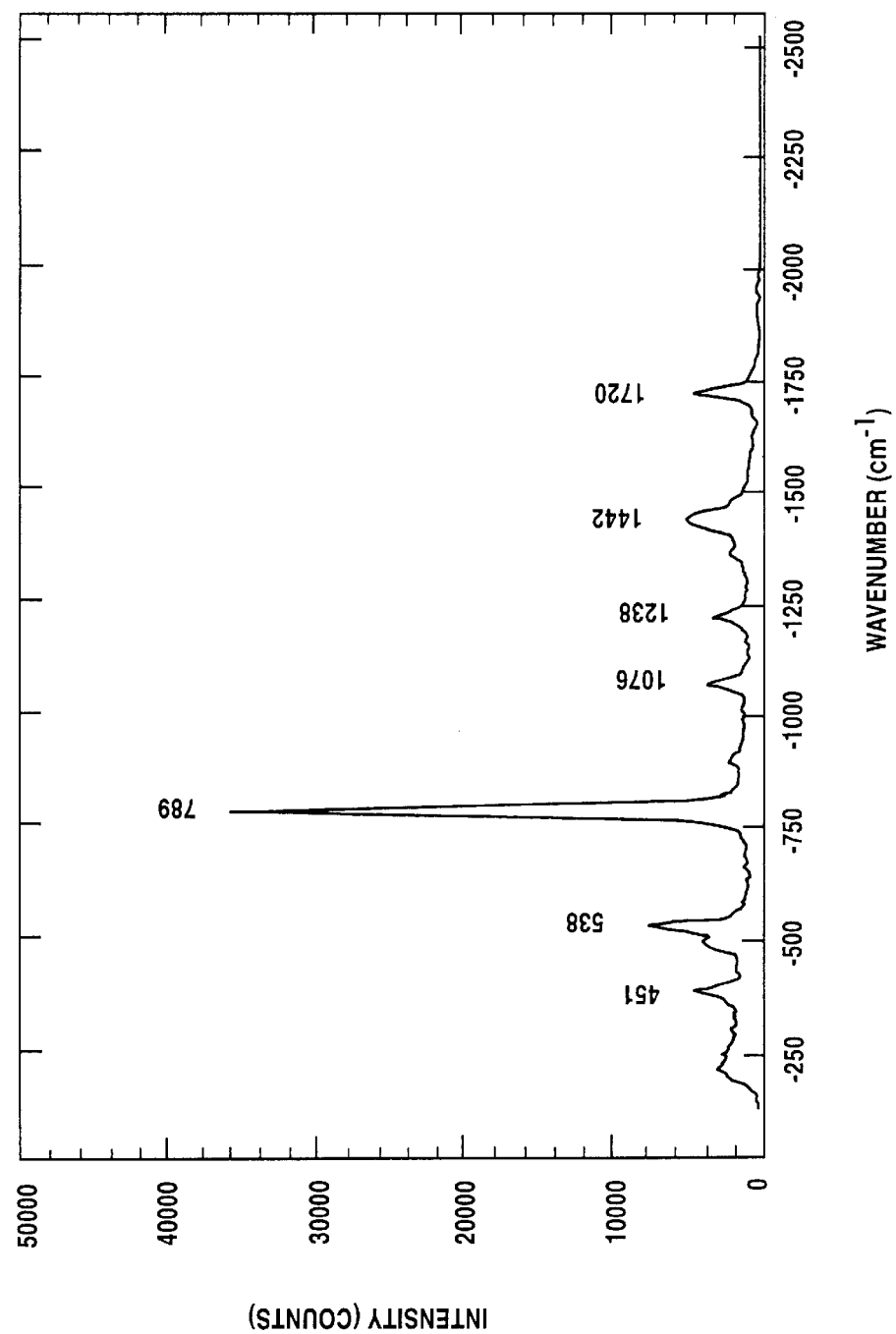
FIG. 23 illustrates the anti-Stokes-Raman scattering spectrum of the same sample as that of FIG. 22.

FIGS. 22 and 23 illustrate the scattering spectra of samples prepared by introducing acetone into human urine measured by the apparatus shown in FIGS. 7 and 8. These figures show the scattering spectrum in the range of a longer wavelength side than the excitation light wavelength and the anti-Stokes-Raman scattering spectrum in the range of −200 to −2500 cm$^{-1}$ on a shorter wavelength side respectively.

While Stokes-Raman scattering peaks of FIG. 22 are almost buried under fluorescence, clear peaks are observed in the anti-Stokes-Raman scattering spectrum shown in FIG. 23.

Figure 24:
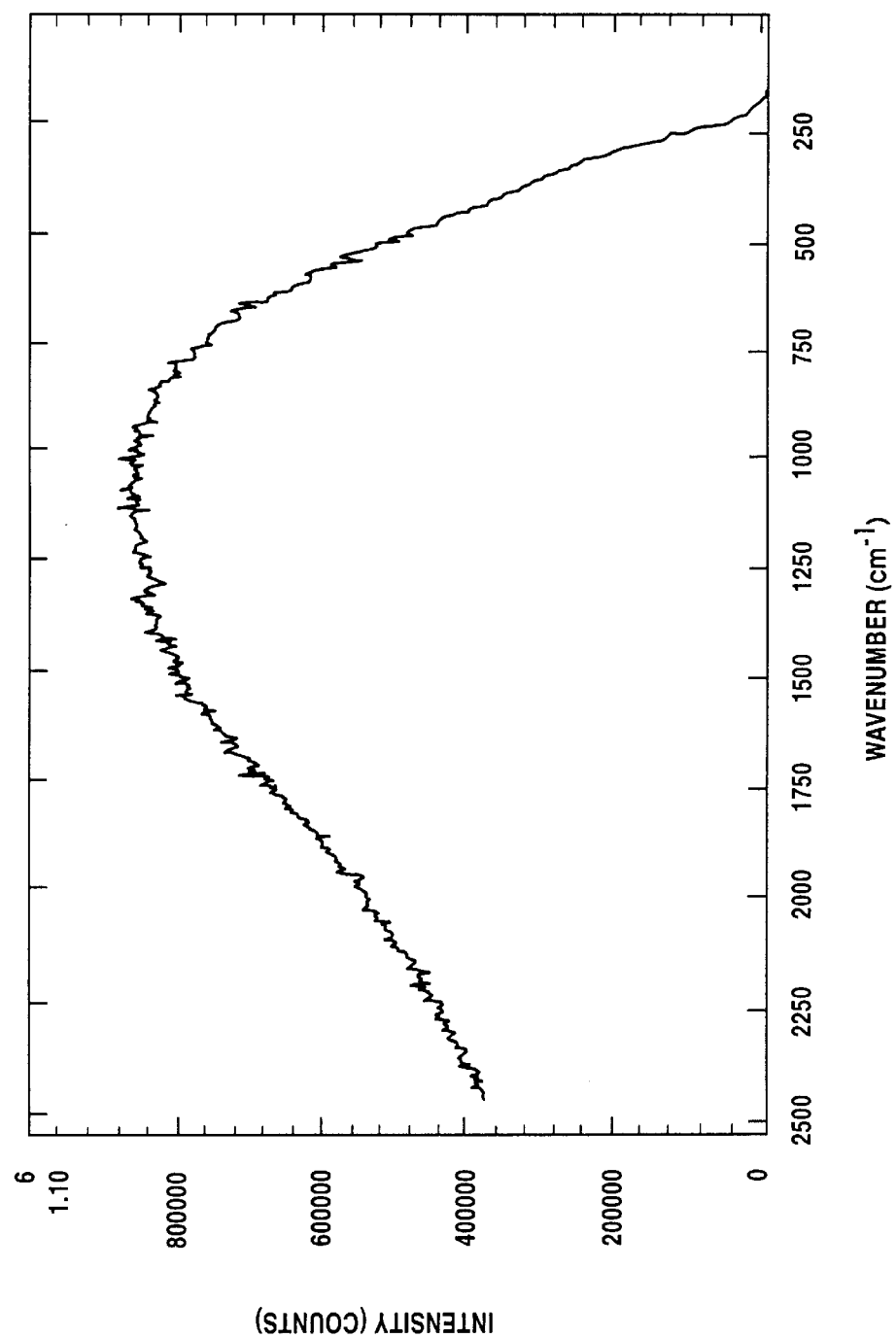
FIG. 24 illustrates the scattering spectrum of a sample prepared from human urine containing urea.
Figure 25:
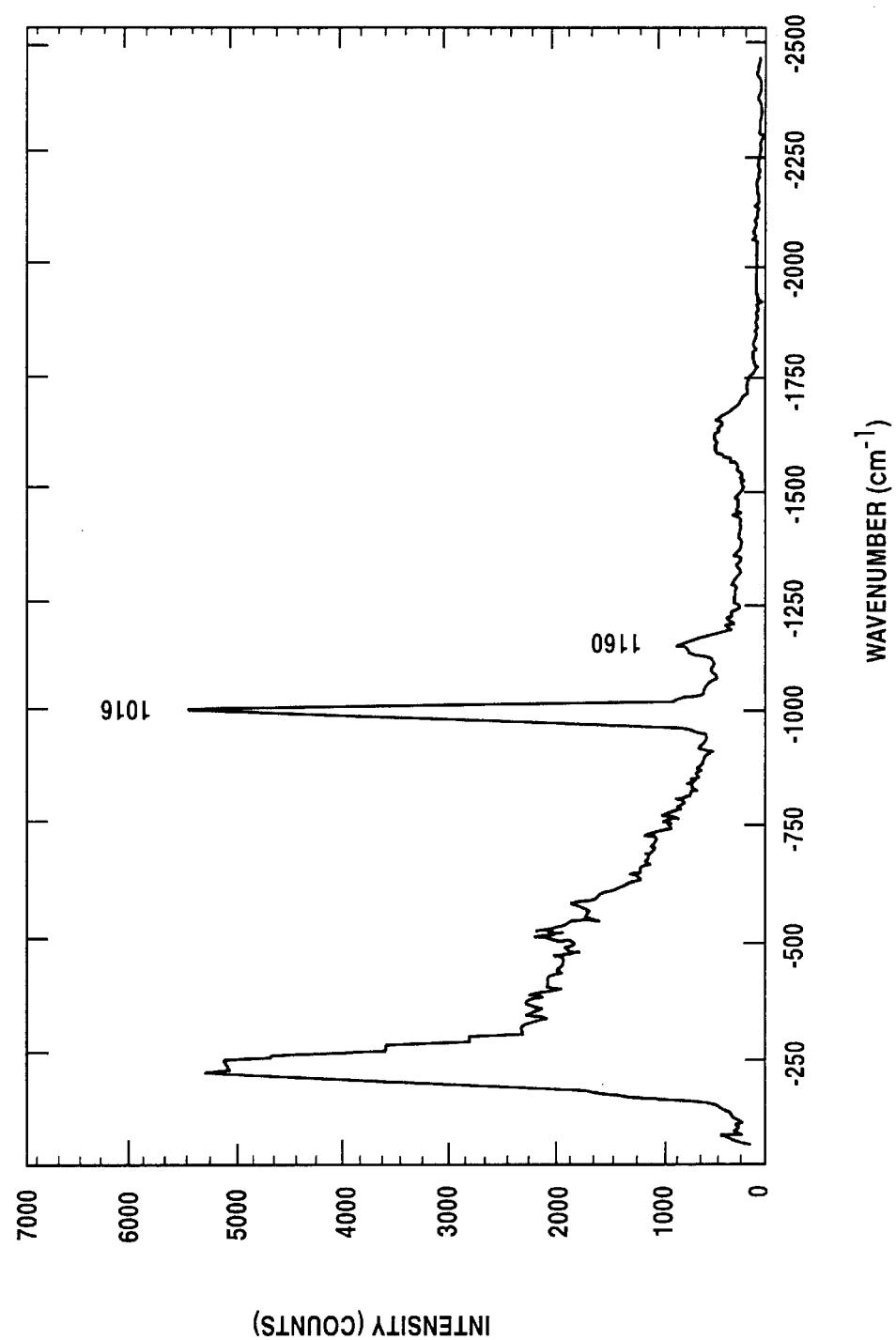
FIG. 25 illustrates the anti-Stokes-Raman scattering spectrum of the same sample as that of FIG. 26.

FIGS. 24 and 25 illustrate the scattering spectra of samples prepared by introducing urea into human urine measured by the apparatus shown in FIGS. 7 and 8. These figures show the scattering spectrum in the range of a longer wavelength side than the excitation light wavelength and the anti-Stokes-Raman scattering spectrum in the range of −200 to −2500 cm$^{-1}$ on a shorter wavelength side respectively.

While Stokes-Raman scattering peaks of FIG. 24 are almost buried under fluorescence, clear peaks are observed in the anti-Stokes-Raman scattering spectrum shown in FIG. 25.

Figure 26:
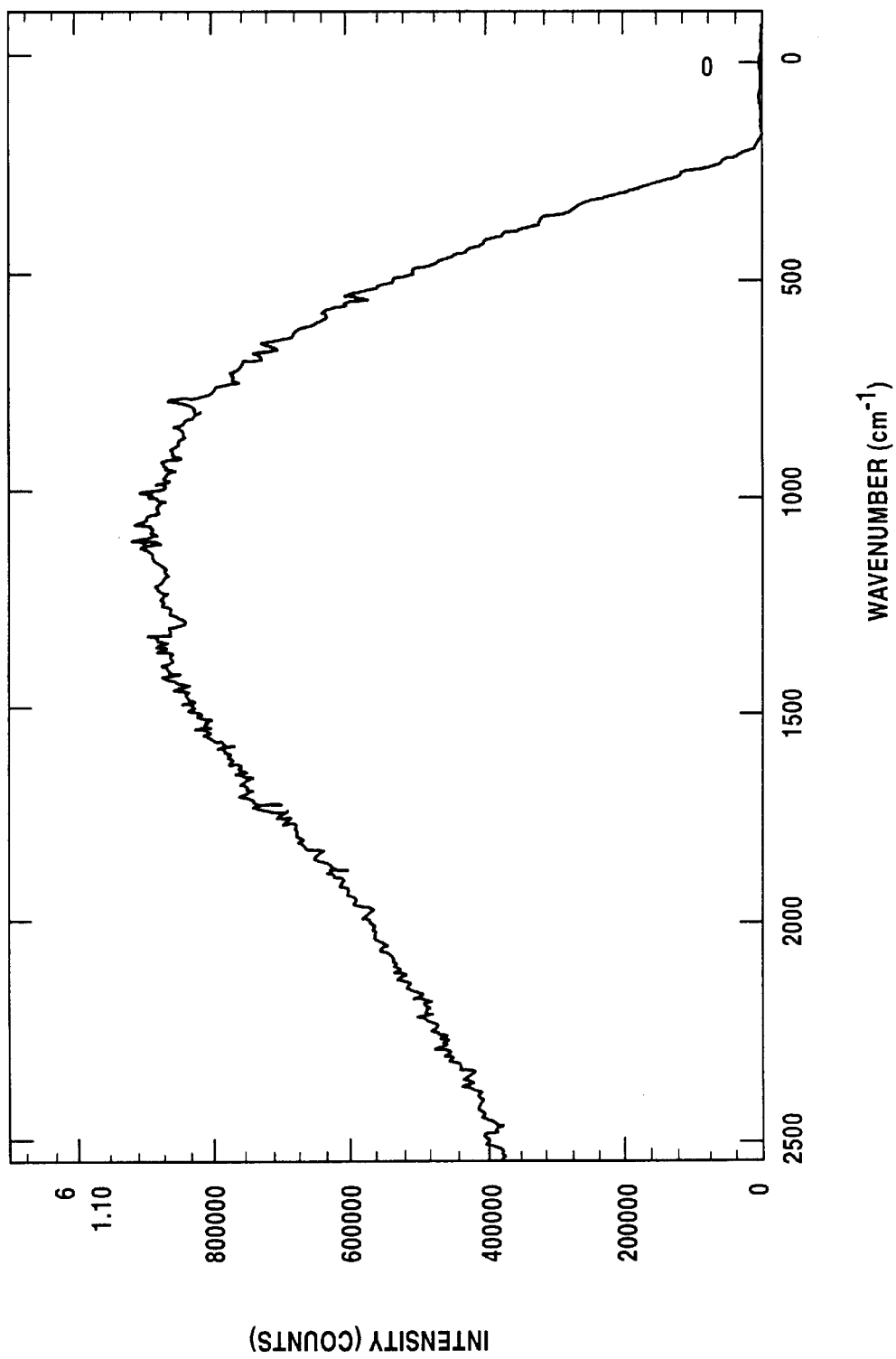
FIG. 26 illustrates the scattering spectrum of a sample prepared from human urine containing glucose, acetone and urea.
Figure 27:
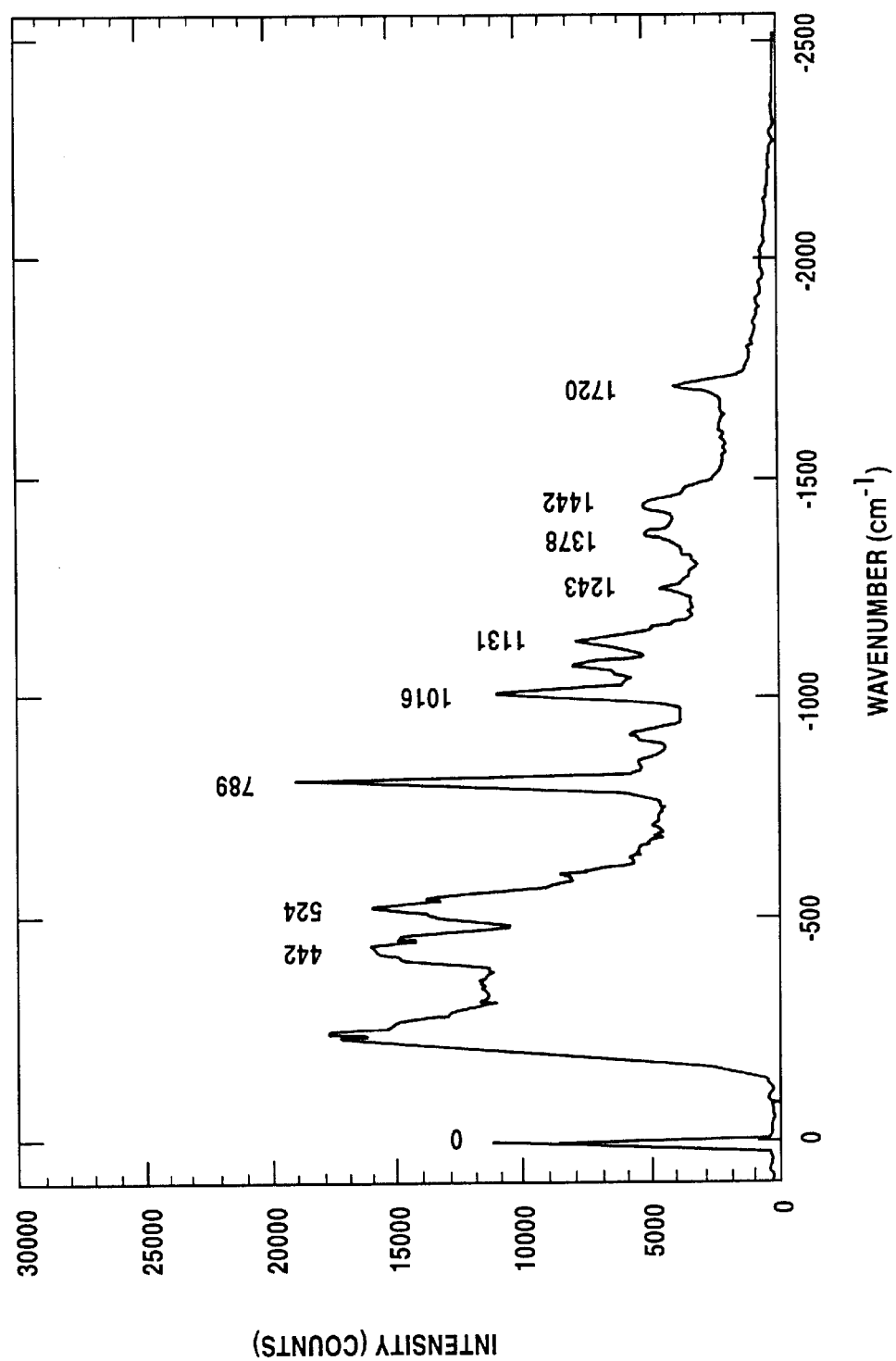
FIG. 27 illustrates the anti-Stokes-Raman scattering spectrum of the sample.

FIGS. 26 and 27 illustrate the scattering spectra of samples prepared by introducing glucose, acetone and urea into human urine measured by the apparatus shown in FIGS. 7 and 8. These figures show the scattering spectrum in the range of a longer wavelength side than the excitation light wavelength and the anti-Stokes-Raman scattering spectrum in the range of 0 to −2500 cm$^{-1}$ on a shorter wavelength side respectively. 0 cm$^{-1}$ is the excitation light wavelength, and reference light at 0 cm$^{-1}$ is simultaneously detected for correcting fluctuation of light source intensity.

While Stokes-Raman scattering peaks of FIG. 26 are almost buried under fluorescence, clear peaks are observed in the anti-Stokes-Raman scattering spectrum shown in FIG. 27.

Description is now made on results obtained by preparing 10 samples by introducing glucose, acetone and urea into human urine and measuring the correlation between peak intensity values and concentrations. The samples were prepared as shown in Table 2.

TABLE 2

| Sample No. | Glucose Concentration (mg/dl) | Acetone Concentration (mg/dl) | Urea Concentration (mg/dl) |
| --- | --- | --- | --- |
| 1 | 120 | 6.58 | 35.6 |
| 2 | 240 | 4.70 | 42.7 |
| 3 | 520 | 5.64 | 28.5 |
| 4 | 320 | 2.82 | 21.4 |
| 5 | 420 | 1.88 | 3.57 |
| 6 | 630 | 3.76 | 7.14 |
| 7 | 740 | 0.94 | 14.2 |
| 8 | 80 | 0.50 | 50.0 |

TABLE 2-continued

| Sample No. | Glucose Concentration (mg/dl) | Acetone Concentration (mg/dl) | Urea Concentration (mg/dl) |
| --- | --- | --- | --- |
| 9 | 160 | 2.35 | 25.0 |
| 10 | 380 | 1.41 | 15.7 |

Figure 28:
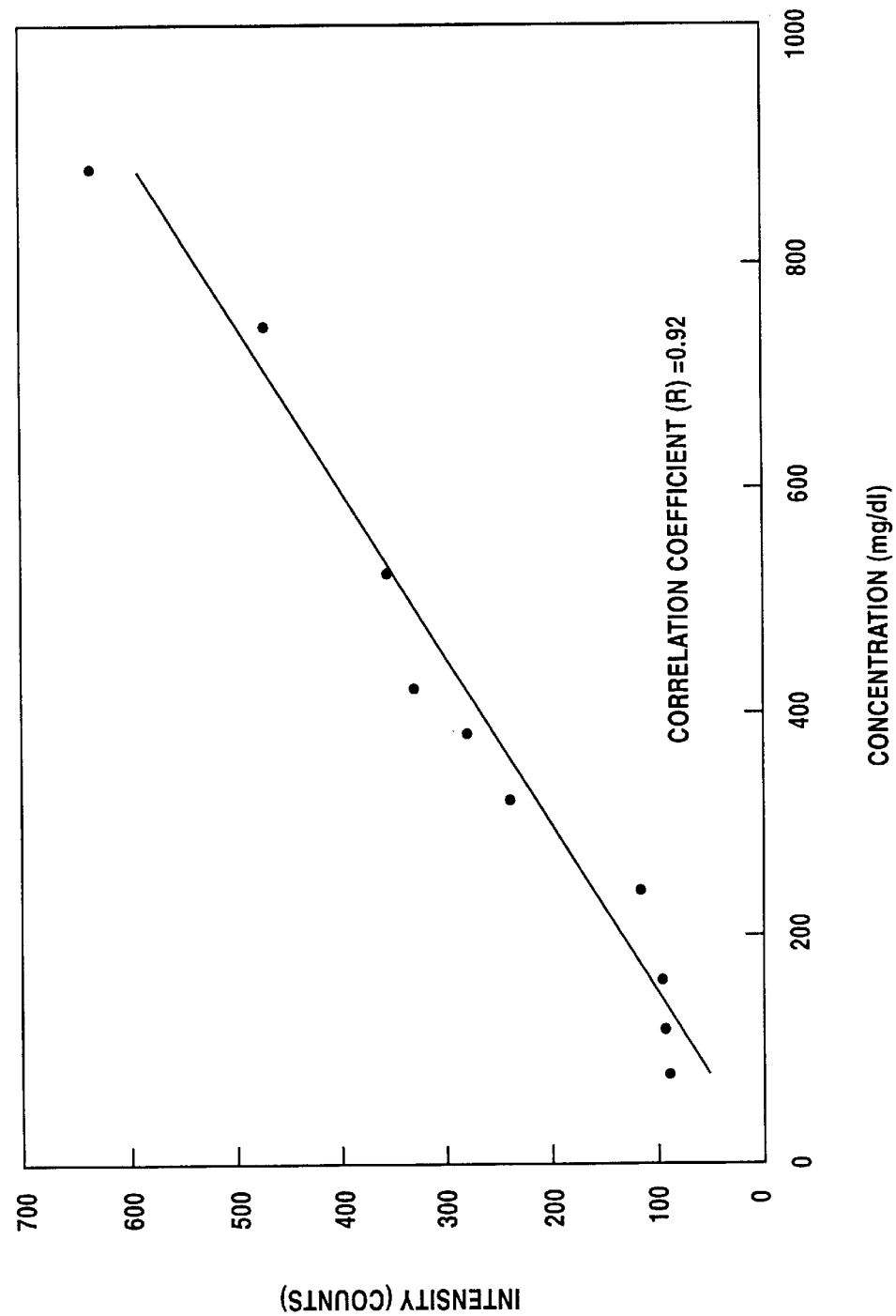
FIG. 28 illustrates the correlation between a glucose concentration and spectral intensity in the anti-Stokes-Raman scattering spectrum of the sample prepared from human urine containing glucose, acetone and urea.

FIG. 28 illustrates the correlation between the spectral intensity in the vicinity of −1130 cm$^{-1}$ in the anti-Stokes-Raman scattering spectrum and the glucose concentration. The correlation coefficient R in this case, which is equal to 0.92, indicates that the correlation is remarkably excellent. A glucose concentration in urine containing a plurality of components can be determined by employing the correlation of FIG. 28 as a calibration curve.

Figure 29:
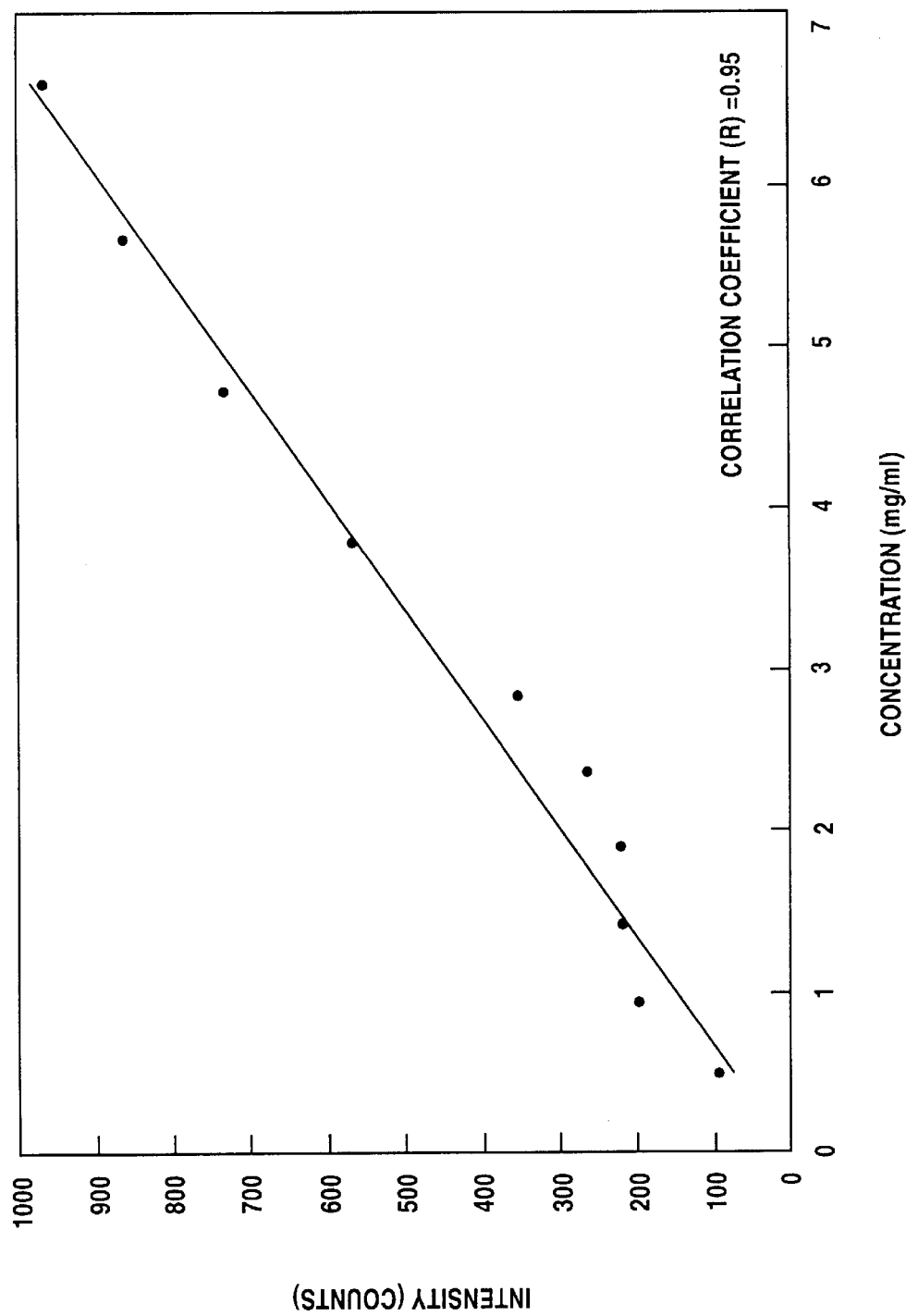
FIG. 29 illustrates the correlation between an acetone concentration and spectral intensity in the anti-Stokes-Raman scattering spectrum of the sample prepared from human urine containing glucose, acetone and urea.

FIG. 29 illustrates the correlation between the spectral intensity in the vicinity of −789 cm$^{-1}$ in the anti-Stokes-Raman scattering spectrum and the acetone concentration. The correlation coefficient R in this case, which is equal to 0.95, indicates that the correlation is remarkably excellent. An acetone concentration in urine containing a plurality of components can be determined by employing the correlation of FIG. 29 as a calibration curve.

Figure 30:
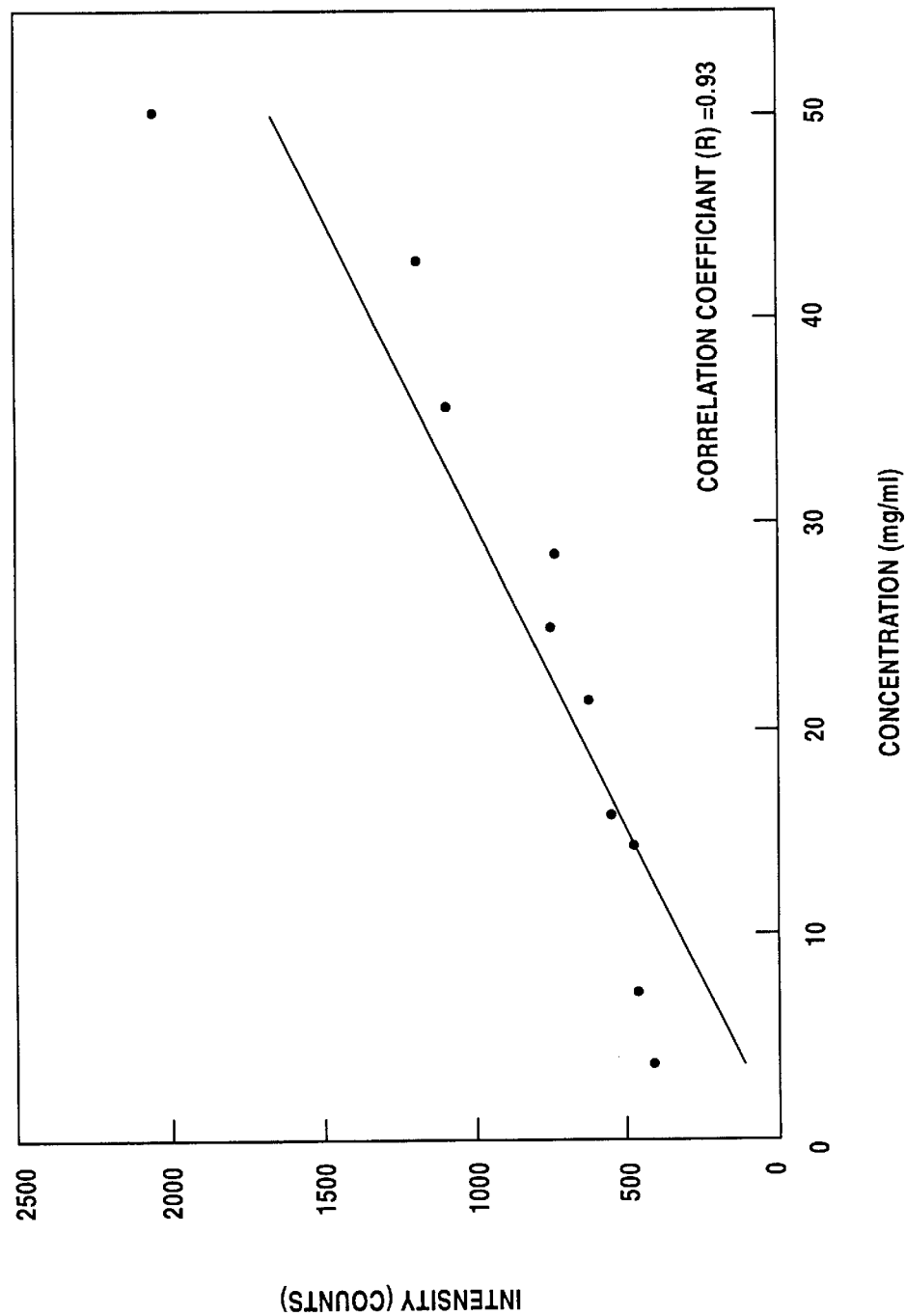
FIG. 30 illustrates the correlation between an urea concentration and spectral intensity in the anti-Stokes-Raman scattering spectrum of the sample prepared from human urine containing glucose, acetone and urea.

FIG. 30 illustrates the correlation between the spectral intensity in the vicinity of −1016 cm$^{-1}$ in the anti-Stokes-Raman scattering spectrum and the urea concentration. The correlation coefficient R in this case, which is equal to 0.93, indicates that the correlation is remarkably excellent. An urea concentration in urine containing a plurality of components can be determined by employing the correlation of FIG. 30 as a calibration curve.

Although the present invention has been described and illustrated in detail, it is clearly understood that the same is by way of illustration and example only and is not to be taken by way of limitation, the spirit and scope of the present invention being limited only by the terms of the appended claims.

We claim:

1. A measuring apparatus comprising:
   an excitation light source part having an excitation light source for irradiating a sample with excitation light of a single wavelenght;
   a sample part where said sample is irradiated with said excitation light;
   a converging optical adjusting part for converging scattered light being generated from said sample being irradiated with said excitation light; and
   a photoreceiving part comprising a photodetector for detecting said scattered light while increasing a density of an anti-Stokes-Raman scattered light.

2. The measuring apparatus in accordance with claim 1, wherein
   said converging optical adjusting part comprises a lens having chromatic aberration; and
   said photoreceiving part has an inlet port for said scattered light on an imaging position of said lens by light of shorter wavelength than a wavelength of said excitation light.

3. The measuring apparatus in accordance with claim 2, wherein
   said photoreceiving part comprises a spectroscope for separating said scattered light being incident from said inlet port into its spectral components.

4. The measuring apparatus in accordance with claim 3, wherein said inlet port of said photoreceiving part is an inlet slit of said spectroscope.

5. The measuring apparatus in accordance with claim 2, wherein said converging optical adjusting part comprises a bandpass filter for passing only a shift wavenumber of said anti-Stokes-Raman scattered light to be detected, and said photoreceiving part detects said scattered light being incident from said inlet port at said photodetector without separating said scattered light.

6. The measuring apparatus in accordance with claim 2, wherein said converging optical adjusting part comprises a lens having small chromatic aberration for converging said scattered light being generated from said sample and guiding said scattered light to said lens having chromatic aberration as a parallel beam on a light incidence side of said lens having chromatic aberration.

7. The measuring apparatus in accordance with claim 2, wherein said inlet port of said photoreceiving part is a first end surface of a single-core optical fiber member, and a second end surface of said optical fiber member is guided to a spectroscope or said photodetector.

8. The measuring apparatus in accordance with claim 2, wherein the distance between said lens of said converging optical adjusting part having chromatic aberration and said inlet port is variable.

9. The measuring apparatus in accordance with claim 1, wherein said excitation light source part comprises a bandpass filter for transmitting only an excitation wavelength being applied to said sample.

10. The measuring apparatus in accordance with claim 1, wherein said converging optical adjusting part comprises a holographic notch filter including an excitation light wavelength in its notch region for removing an excitation light wavelength component.

11. The measuring apparatus in accordance with claim 10, wherein said excitation light source part comprises a bandpass filter for transmitting only an excitation wavelength being applied to said sample, and said notch region is symmetrical with a bandpass region of said bandpass filter.

12. The measuring apparatus in accordance with claim 11, wherein said converging optical adjusting part comprises a cut filter for blocking off an excitation light wavelength and a longer wavelength side for removing an excitation light wavelength component.

13. The measuring apparatus in accordance with claim 1, wherein said sample part comprises a spherical cell and an integrating sphere type cell holder having a spherical reflecting surface as a portion for holding said cell.

14. The measuring apparatus in accordance with claim 1, further comprising an optical system for reference light for detecting a part of said excitation light.

15. The measuring apparatus in accordance with claim 1, further comprising a data processing part for multiplying a Boltzmann distribution showing the existence probability of said anti-Stokes-Raman scattering by the photoreceiving density reinforcing effect of said anti-Stokes-Raman scattering and correcting the result for making an operation so that photosensitivity for said anti-Stokes-Raman scattered light is constant over a prescribed range on a shorter wavelength side than said excitation light wavelength.

16. A measuring method comprising the steps of irradiating a sample of a vital substance with excitation light of single wavelength, and detecting an anti-Stokes-Raman scattering intensity in scattered light being generated from said sample while increasing a density of the anti-Stokes-Raman scattered light for measuring a target substance in said sample.

17. The measuring method in accordance with claim 16, wherein a shift wavenumber having excellent correlation between the concentration of said target substance in said sample and anti-Stokes-Raman scattering intensity is selected as a measuring shift wavenumber being specific to said target substance, and said anti-Stokes-Raman scattering intensity is detected at said measuring shift wavenumber thereby quantitatively analyzing said target substance in said sample through a calibration curve.

18. The measuring method in accordance with claim 16, wherein said measuring shift wavenumber is a shift wavenumber having a correlation coefficient R of at least 0.6 between the concentration of said target substance and said anti-Stokes-Raman scattering intensity.

19. The measuring method in accordance with claim 16, wherein said measuring shift wavenumber is a shift wavenumber having a correlation coefficient R of at least 0.8 between the concentration of said target substance and said anti-Stokes-Raman scattering intensity.

* * * * *